(12) United States Patent
Yeung et al.

(10) Patent No.: US 12,377,385 B2
(45) Date of Patent: Aug. 5, 2025

(54) TWO-DIMENSIONAL CATALYTIC MATERIALS DERIVED FROM METAL-ORGANIC FRAMEWORKS FOR VOC REMEDIATION

(71) Applicant: THE HONG KONG UNIVERSITY OF SCIENCE AND TECHNOLOGY, Hong Kong (CN)

(72) Inventors: King Lun Yeung, Hong Kong (CN); Qingyue Wang, Hong Kong (CN); Zhimin Li, Hong Kong (CN); Wei Han, Hong Kong (CN)

(73) Assignee: THE HONG KONG UNIVERSITY OF SCIENCE AND TECHNOLOGY, Hong Kong (CN)

( * ) Notice: Subject to any disclaimer, the term of this patent is extended or adjusted under 35 U.S.C. 154(b) by 298 days.

(21) Appl. No.: 16/527,558

(22) Filed: Jul. 31, 2019

(65) Prior Publication Data
US 2020/0094187 A1    Mar. 26, 2020

Related U.S. Application Data

(60) Provisional application No. 62/764,371, filed on Aug. 1, 2018.

(51) Int. Cl.
| | | |
|---|---|---|
| B01D 53/86 | (2006.01) | |
| B01J 21/06 | (2006.01) | |

(Continued)

(52) U.S. Cl.
CPC ........ B01D 53/8668 (2013.01); B01J 21/066 (2013.01); B01J 23/10 (2013.01);
(Continued)

(58) Field of Classification Search
CPC ........ B01D 53/8668; B01D 2255/2065; B01D 2255/20715; B01D 2255/20723;
(Continued)

(56) References Cited

PUBLICATIONS

Yonghai Song, Xia Li, Lanlan Sun, Li Wang, "Metal/metal oxide nanostructures derived from metal-organic frameworks", The Royal Society of Chemistry (RSC Adv.), 2015, 5, 7267-7279. (Year: 2015).*

(Continued)

Primary Examiner — Anita Nassiri-Motlagh
(74) Attorney, Agent, or Firm — Nath, Goldberg & Meyer; Joshua B. Goldberg

(57) ABSTRACT

Porous metal oxide catalytic materials with planar morphologies which are derived from metal-organic framework (MOF) materials via thermal decomposition, oxidation pretreatment and pyrolysis processes. The porous metal oxides are mainly transition metal oxides, derived from MOFs containing the corresponding transition metal ions, such as Cu, Zn, Y, La, Ce, Ti, Zr, V, Cr, Mn, Fe, Co, and Ni ions. The transformation conditions from MOF materials to metal oxides, such as temperature, atmosphere and duration, are well defined to obtain metal oxides with controlled morphologies. Furthermore, the present subject matter relates to a low-temperature catalytic decomposition of volatile organic compounds (VOCs) with a wide concentration range on two-dimensional metal oxides.

8 Claims, 22 Drawing Sheets

(51) Int. Cl.

| | |
|---|---|
| *B01J 23/10* | (2006.01) |
| *B01J 23/22* | (2006.01) |
| *B01J 23/26* | (2006.01) |
| *B01J 23/34* | (2006.01) |
| *B01J 23/72* | (2006.01) |
| *B01J 23/745* | (2006.01) |
| *B01J 23/75* | (2006.01) |
| *B01J 23/755* | (2006.01) |
| *B01J 23/83* | (2006.01) |
| *B01J 35/56* | (2024.01) |
| *B01J 37/08* | (2006.01) |

(52) U.S. Cl.
CPC ............... *B01J 23/22* (2013.01); *B01J 23/26* (2013.01); *B01J 23/34* (2013.01); *B01J 23/72* (2013.01); *B01J 23/745* (2013.01); *B01J 23/75* (2013.01); *B01J 23/755* (2013.01); *B01J 23/83* (2013.01); *B01J 35/56* (2024.01); *B01J 37/086* (2013.01); B01D 2255/2065 (2013.01); B01D 2255/20715 (2013.01); B01D 2255/20723 (2013.01); B01D 2255/2073 (2013.01); B01D 2255/20738 (2013.01); B01D 2255/20746 (2013.01); B01D 2255/20753 (2013.01); B01D 2255/20761 (2013.01); B01D 2255/20784 (2013.01); B01D 2257/708 (2013.01)

(58) Field of Classification Search
CPC .. B01D 2255/2073; B01D 2255/20738; B01D 2255/20746; B01D 2255/20753; B01D 2255/20761; B01D 2255/20784; B01D 2257/708; B01J 21/066; B01J 23/10; B01J 23/22; B01J 23/26; B01J 23/34; B01J 23/72; B01J 23/745; B01J 23/75; B01J 23/755; B01J 23/83; B01J 35/04; B01J 37/086

USPC ..................................................... 423/245.3
See application file for complete search history.

(56) References Cited

PUBLICATIONS

Zhang et al., "Formation of Fe2O3 Microboxes with Hierarchical Shell Structures from Metal-Organic Frameworks and Their Lithium Storage Properties", J. Am. Chem. Soc. 2012, 134, 17388-17391. (Year: 2012).*

Bai et al., "1D-MnO2, 2D-MnO2 and 3D-MnO2 for low-temperature oxidation of ethanol", Applied Catalysis B: Environmental 164 (2015) 241-250. (Year: 2015).*

Cao et al., "Two-Dimensional Porous Micro/Nano Metal Oxide Templated by Graphene Oxide", ACS Appl. Mater. Interfaces 2015, 7, 22, 11984-11990. (Year: 2015).*

Kalantar-zadeh et al., "Two dimensional and layered transition metal oxides", Applied Materials Today 5 (2016) 73-89. (Year: 2016).*

Qian et al., "China rose petal as biotemplate to produce two-dimensional ceria nanosheets", J Nanopart Res (2011) 13:7149-7158. (Year: 2011).*

Shigapov et al., "The preparation of high-surface area, thermally-stable, metal-oxide catalysts and supports by a cellulose templating approach", Applied Catalysis A: General 210 (2001) 287-300. (Year: 2001).*

Lei et al., "A facile method for the synthesis of graphene-like 2D metal oxides and their excellent catalytic application in the hydrogenation of nitroarenes", Journal of Materials Chemistry A, Apr. 21, 2018, 6, 9948-9961. (Year: 2018).*

Cabus-Llaurado et al., "Microporous high-surface area layered CeO2", Microporous and Mesoporous Materials 100 (2007) 167-172. (Year: 2007).*

Fang et al., "Metal-organic framework-templated two-dimensional hybrid bimetallic metal oxides with enhanced lithium/sodium storage capability", J. Mater. Chem. A, 2017, 5, 13983-13993. (Year: 2017).*

* cited by examiner

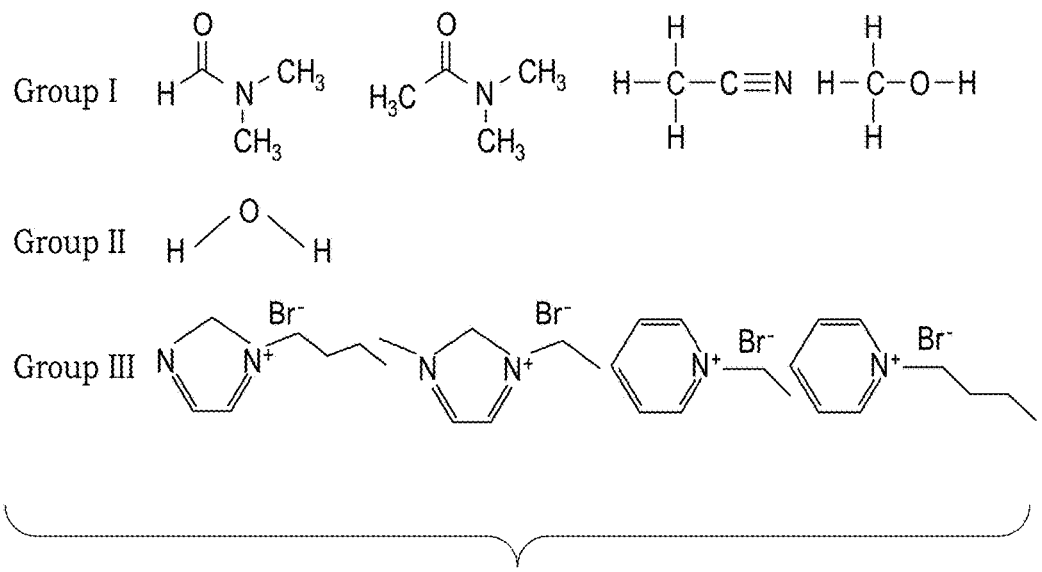
FIG. 1C
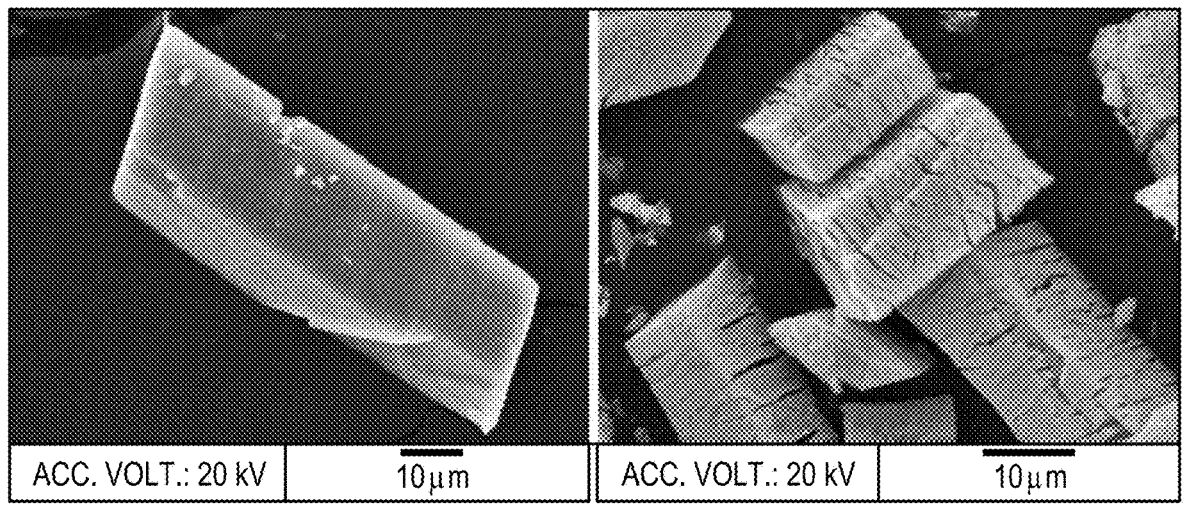
FIG. 2A      FIG. 2B

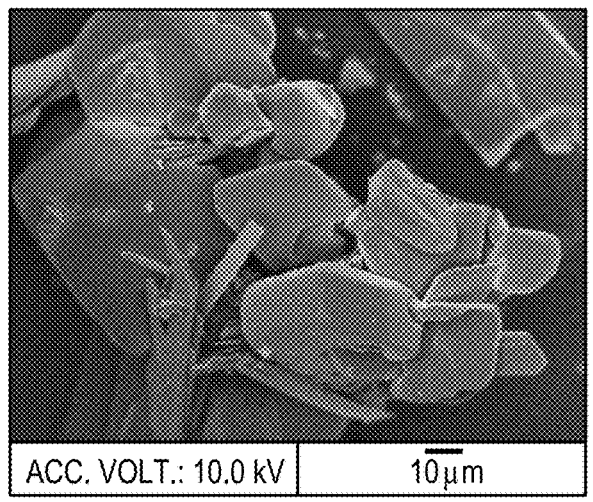
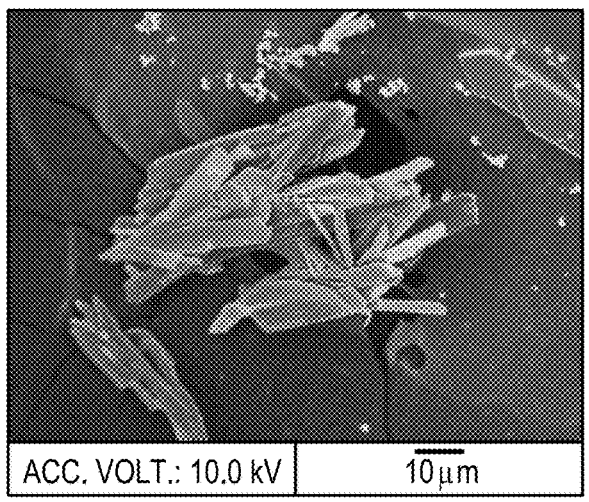
FIG. 3A  FIG. 3B
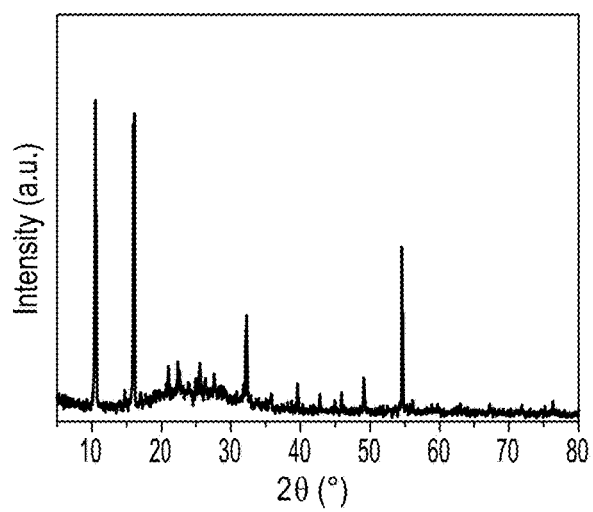
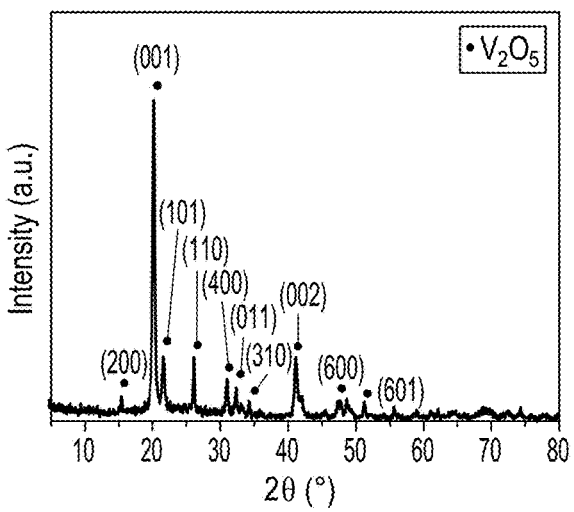
FIG. 3C  FIG. 3D

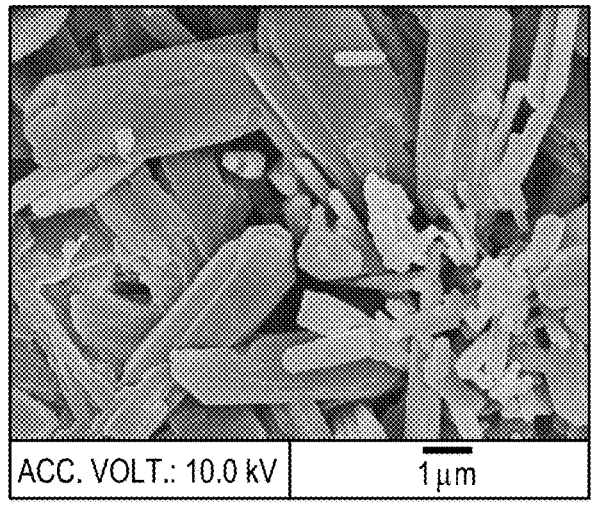
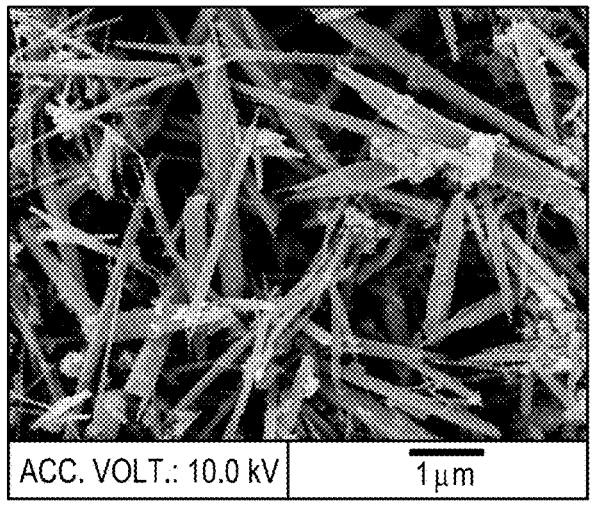
FIG. 4A  FIG. 4B
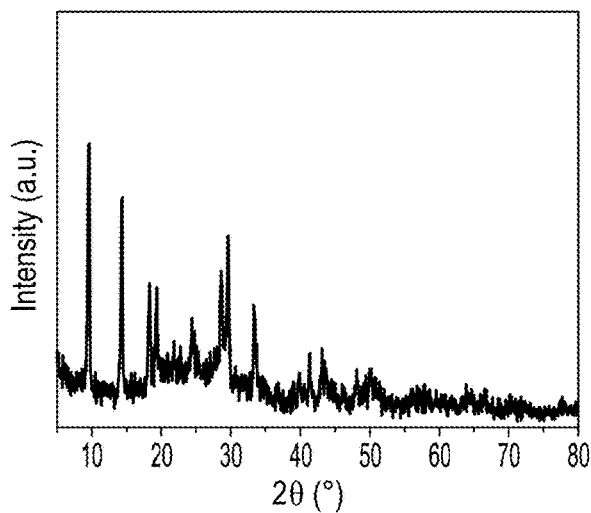
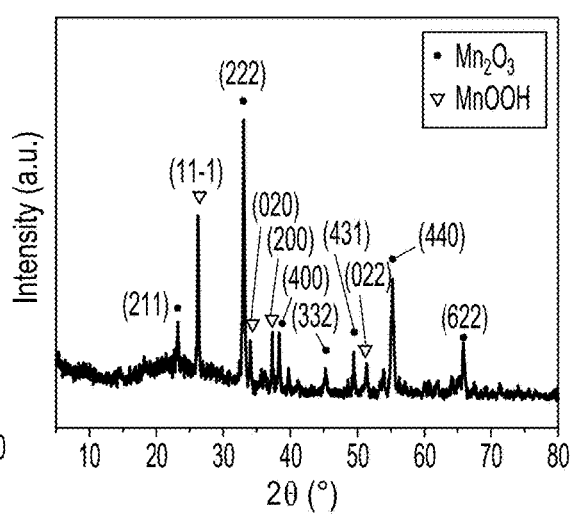
FIG. 4C  FIG. 4D

TWO-DIMENSIONAL CATALYTIC MATERIALS DERIVED FROM METAL-ORGANIC FRAMEWORKS FOR VOC REMEDIATION

BACKGROUND

Volatile organic compounds (VOCs) are compounds containing carbon that both vaporize into air and dissolve in water, and that easily become vapors or gases at typical room temperature. VOCs can be released from many sources, including burning fuels (such as gasoline, wood, coal, or natural gas), and many consumer products produced using volatile solvents. Many VOCs pose serious threats to human health as well as the ecological environment. As a result, VOCs have become a worldwide risk of growing concern.

Most VOCs are irritants that cause discomfort and psychological stress to the exposed individual. Some VOCs trigger autoimmune responses such as asthma or eczema, or airway inflammation causing respiratory distress. Some VOCs, including many organic solvents such as formaldehyde, benzene, and toluene, are known or suspected carcinogens.

VOCs have become more prevalent around the world, as more countries continue to develop and expand their technology and manufacturing industries, as well as increase the number of cars, trucks, motorcycles, recreational vehicles, and outdoor household equipment such as lawn mowers, snow blowers, and barbeque equipment that burn fossil fuels. Consumption of motor gasoline alone has increased worldwide to well over 20 million barrels per day. As VOCs continue to pollute our environment and increasingly create potential and real health issues, we clearly need more and better ways to eliminate VOCs from our environment and our atmosphere.

Many methods have been developed to eliminate VOCs, such as adsorption, membrane separation, and catalytic oxidation. The active catalysts for VOC remediation can be divided into two categories: transition metal oxide catalysts, and noble metal-supported catalysts. Transition metal oxides have attracted much attention for VOC remediation for their relative abundance on the earth and lower cost compared to expensive and scarce noble metals. It has been reported that catalytic materials with the same chemical composition, but different morphologies and porous structures, may exhibit different catalytic activities in complete oxidation of VOCs.

For the treatment of VOCs, a few metal-organic frameworks (MOFs) have been developed as adsorbents. MOFs are crystalline multifunctional porous materials that are composed of metal ions and organic ligands, which have been shown to be promising for uses in gas storage, separation, catalysis, and drug delivery systems. For example, MOF-5 is a good adsorbent for formaldehyde for both indoor and outdoor environments, based on its high surface area, unique structure, and good thermal stability. Anal. Chem., vol. 82, pp. 1365-1370 (2010).

Catalytic combustion of VOCs is often deemed important, providing efficient removal of VOCs at lower temperature and with less secondary pollution than other methods of reducing VOCs. One example provides catalytic combustion of toluene using mesoporous $Cr_2O_3$-supported platinum catalysts, prepared by in situ pyrolysis of MOFs. Chen, et al., Chem. Engineering J., vol. 334, pp. 768-79 (2018).

However, uses of MOFs often are accompanied by significant drawbacks, such as limited lifetime duration and capacity. This inhibits the viable use of such MOFs for further development and applications.

SUMMARY

The present subject matter relates to preparation of transition metal oxide catalysts derived from metal-organic frameworks (MOFs) containing the corresponding metal ions. In an embodiment, porous transition metal oxide catalysts are prepared by controlled decomposition of MOF materials. These catalysts with specially designed chemical compositions and morphologies contribute to efficient catalytic conversion of VOCs to $CO_2$ and $H_2O$ at relatively low temperatures (<150° C.).

In one embodiment, the present subject matter relates to a method of preparing a metal oxide catalyst for oxidizing volatile organic compounds (VOCs), comprising
 (a) preparing a metal-organic framework (MOF) material; and
 (b) decomposing the MOF material by heating it to produce a metal oxide catalyst useful for removing one or more VOCs from the atmosphere or environment. The metal oxide catalyst may be a transition metal oxide catalyst. Likewise, the metal organic framework may be a transition metal organic framework. Accordingly, in certain embodiments, the metal involved in the process and the final product can be a transition metal.

In other embodiments, the present subject matter relates to the metal oxide catalysts, or transition metal oxide catalysts, produced according to the present methods, metal oxide catalyst formulations containing such metal oxide catalysts, and methods of using the same.

BRIEF DESCRIPTION OF THE DRAWINGS

FIG. 1C depicts non-limiting examples of solvents, water, and ionic liquids that may be useful as reaction media to conduct the solvothermal, hydrothermal, or ionothermal syntheses for preparing MOFs, where Group I represents potential solvents, Group II represents water, and Group III represents potential ionic liquids.

FIGS. 2A-2F presents Scanning Electron Microscope (SEM) images, powdered x-ray diffraction (XRD) patterns, and Raman spectra of MOF material Ce-BDC (2A, 2C, and 2E, respectively) and metal oxide $CeO_2$ (2B, 2D, 2F, respectively)

FIGS. 3A-3H present SEM images, XRD patterns and Raman spectra of MOF material (V-BDC) (3A, 3C, and 3E, respectively) and metal oxide $V_2O_5$ (3B, 3D, and 3F, respectively); and FTIR spectra (3G) and a TG curve (3H) in air of V-BDC.

FIGS. 4A-4H present SEM images, XRD patterns and Raman spectra of MOF material Mn-BDC (4A, 4C, and 4E, respectively) and metal oxide $MnO_x$ (4B, 4D, and 4F, respectively); and FTIR spectra (4G) and TG curve in air (4H) of Mn-BDC.

DETAILED DESCRIPTION

Definitions

Figure 1A:
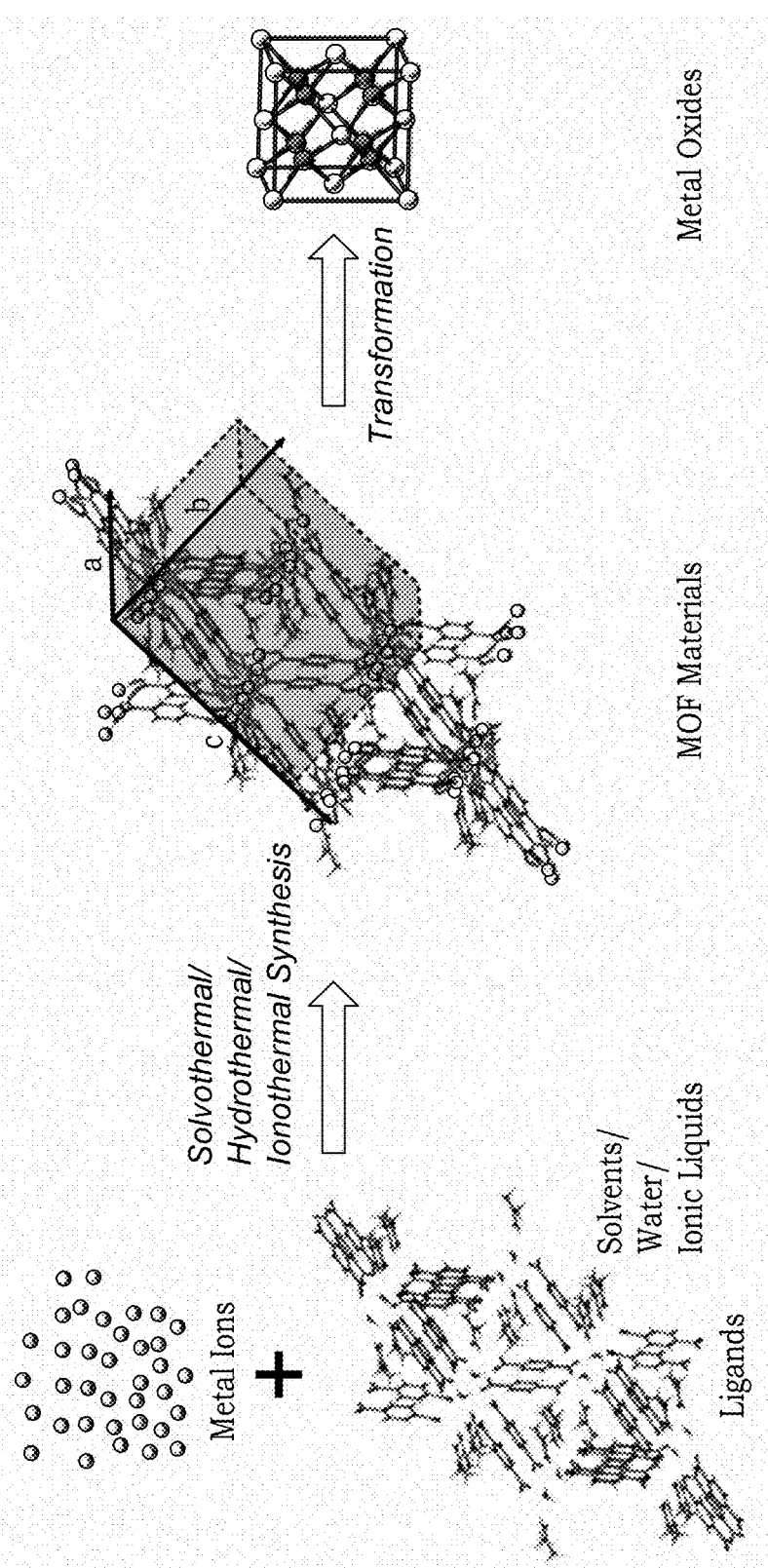
FIG. 1A shows a schematic diagram of the preparation procedure to prepare metal oxide catalysts derived from MOF materials prepared from metal ions, organic ligands, and solvents, water, or ionic liquids, in solvothermal/hydrothermal/ionothermal syntheses.

The following definitions are provided for the purpose of understanding the present subject matter and for constructing the appended patent claims.

It is noted that, as used in this specification and the appended claims, the singular forms "a", "an", and "the" include plural references unless the context clearly dictates otherwise.

As used herein, "VOC" or "VOCs" refer to volatile organic compound(s), namely compounds containing carbon that can both vaporize into air and dissolve in water, and that easily become vapors or gasses at typical room temperature.

As used herein, "MOF" or "MOFs" refer to metal-organic framework(s), which are crystalline multifunctional porous materials composed of metal ions and organic ligands. MOFs typically possess good adsorbent properties.

As used herein, "BDC" refers to 1,4-benzenedicarboxylic acid.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

Metal Oxide Catalysts

The present subject matter relates to metal oxide catalytic materials or metal oxide catalysts, particularly transition metal oxide catalytic materials, and their preparation methods. The materials are derived from MOF materials via one or more of thermal decomposition, oxidation pretreatment, and pyrolysis processes.

Thermal decomposition may involve, for example, heating a MOF such as Ce-BDC in a crucible placed in a furnace under air, and heating to 400° C., or 500° C., or 600° C., for 4 hours. See Examples 2-4. Oxidation pretreatment involves, for example, heating a MOF such as Ce-BDC in a flask with ozone flow, heated to 100° C. for 12 hours to provide $CeO_2$. The $CeO_2$ may then be further calcined in air at 250° C. for two hours, or at 400° C. for four hours. Alternatively, for example, Ce-BDC can be calcined in a furnace with oxygen flow, at 300° C. for 4 hours. See Examples 5-8. And pyrolysis can be accomplished, for example, by heating a MOF such as Ce-BDC in a crucible, placed in a furnace with nitrogen flow at 650° C. for four hours, followed by air flow at 350° C. for two hours.

The metal oxides that result from these processes are porous and can have planar or two-dimensional morphologies. In an embodiment, this means the resulting metal oxides possess plate-like or sheet-like morphologies. As used herein, the phrases "metal oxide catalytic materials" and "metal oxide catalysts" can be used interchangeably.

The following further description of these metal oxide catalytic materials is divided into three distinct parts: (A) Preparation; (B) Characterization; and (C) Application in catalyzing oxidation of VOC compounds.

(A) Preparation

The preparation of porous metal oxide catalytic materials includes the following steps:

(1) Preparation of MOF materials by solvothermal, hydrothermal, or ionothermal syntheses; followed by (2) Transformation of the MOF materials under specific conditions of temperature, atmosphere and duration to obtain porous metal oxide catalytic materials.

FIG. 1A shows a representative schematic for the preparation procedure of metal oxide catalysts derived from MOF materials. First, a MOF material is prepared. Then, the MOF material is transformed into the corresponding metal oxide catalyst.

According to one aspect, the MOF materials are prepared using a variety of synthesis component. Such synthesis components can include, as shown in FIG. 1A, metal ions, ligands, and a solvent, water, and/or an ionic liquid, as reaction components to prepare the MOF material. Typically, the solution of metal ion precursors, organic ligands and reaction media are sealed in a closed system and heated up to certain temperature and kept for certain period.

In one embodiment, non-limiting examples of the metal ions used to produce the MOF are selected from the group consisting of Group IB, IIB, IIIB, IVB, VB, VIB, VIIB, and VIIIB elements on the periodic table of elements, and combinations thereof. In certain embodiments, specific non-limiting examples of the metal ions used to produce the MOF are selected from the group consisting of scandium, titanium, vanadium, chromium, manganese, iron, cobalt, nickel, copper, zinc, yttrium, zirconium, niobium, molybdenum, ruthenium, rhodium, silver, cadmium, hafnium, mercury, lanthanum, cerium, praseodymium, neodymium, samarium, europium, gadolinium, terbium, dysprosium, erbium and ytterbium, preferably copper, zinc, lanthanum, cerium, titanium, zirconium, vanadium, chromium, manganese, iron, cobalt, nickel, and combinations thereof.

In other embodiments, specific non-limiting examples of the metals used to produce the MOF are selected from the group consisting of cerium, vanadium, manganese, nickel, copper, zirconium, chromium, iron, cobalt, and combinations thereof. In certain embodiments, the metal is used in cation form.

Figure 1B:
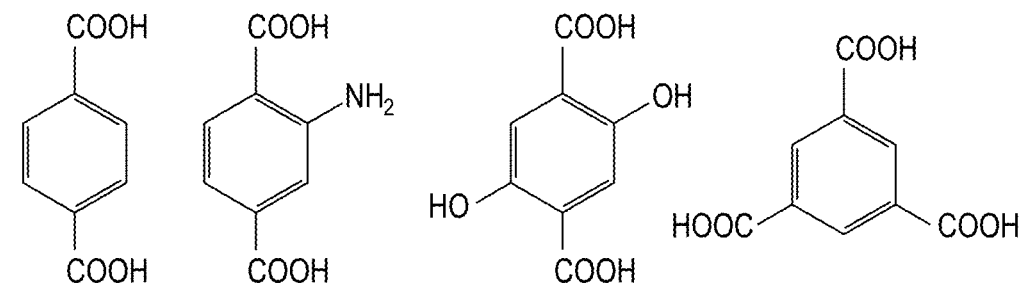
FIG. 1B depicts non-limiting examples of organic ligands useful in preparing MOFs.
Figure 1B:
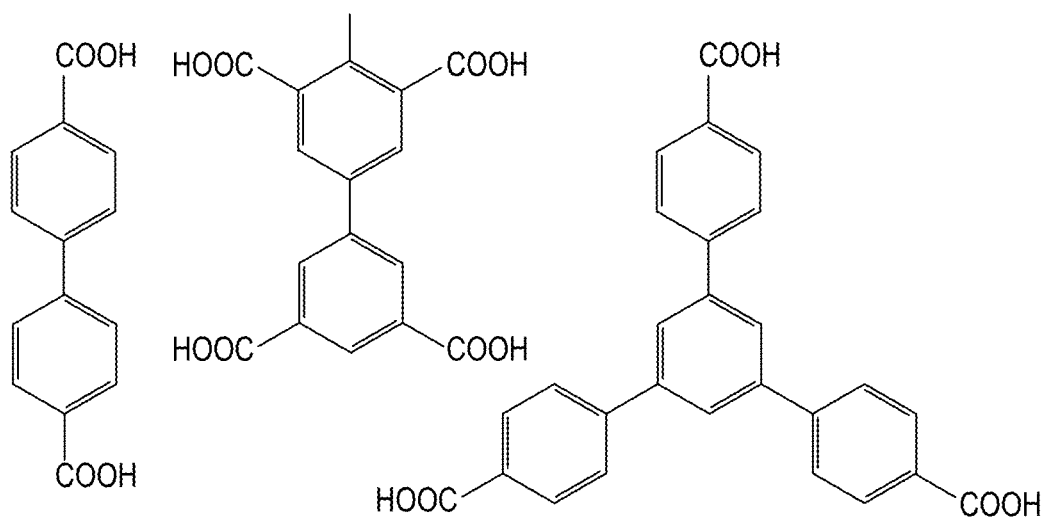
Figure 1B:
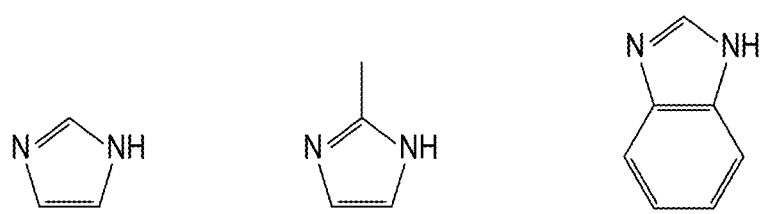

Organic ligands useful in preparing the MOFs can be selected from various amine, amide, carboxylic acids, and imidazole functional groups. Certain specific, non-limiting examples of ligands useful herein include those depicted in FIG. 1B.

Solvents, water and/or ionic liquids are used as reaction media to conduct solvothermal, hydrothermal and ionothermal syntheses, respectively, for the preparation of MOF materials. Typically, for example, these procedures involve dissolving and mixing solutions of the metal ion precursor and the organic ligand in a reaction medium such as DMF or ethanol, followed by heating in an autoclave. The resulting product is then washed and dried. See, for example, the procedures outlined below in Examples 1, 10, 12, 14, 16, 18, 20, 22, 24, and 26.

Suitable, non-limiting, examples of substances which can be useful in this regard include those depicted in FIG. 1C, with Group I representing potential solvents, Group II representing water, and Group III representing potential ionic liquids.

The resultant metal oxides preferably contain one or more metal element(s) from Groups IB, IIB, IIIB, IVB, VB, VIB, VIIB, VIIIB in the periodic table. For example, the metal oxides may contain one or more of the following cations: copper, zinc, yttrium, lanthanum, cerium, titanium, zirconium, vanadium, chromium, manganese, iron, cobalt, and nickel.

The structure of a typical MOF material, $Ce_2(BDC)_3(DMF)_3(H_2O)$, is shown in FIG. 1A.

The transformations from MOF materials to metal oxides are carried out under specific temperature, atmosphere, and duration of time. The transformation atmosphere can be inert or oxidizing. The transformation temperature depends on MOF materials and atmosphere. Typical weight loss during transformation process from MOF materials to metal oxide is 25~80%.

In one embodiment, a decomposition process is used to effect the transformation of the MOF to the metal oxide catalysts. According to this decomposition process, the MOF is heated to produce a metal oxide catalyst useful for removing one or more VOCs from an atmosphere or environment. In one embodiment, the decomposition process is carried out by heating the MOF to a temperature greater than the MOF's decomposition temperature. In certain embodiments, the decomposition process is carried out by heating the MOF to a temperature ranging from about 100° C. to 1000° C. In other embodiments, the decomposition process is carried out by heating the MOF to a temperature ranging from about 100° C. to 800° C.

In another embodiment, the decomposition process is carried out by heating the MOF in an inert atmosphere. In a further embodiment, the decomposition process is carried out by heating the MOF in an atmosphere without added ozone. In an alternative embodiment, the decomposition process is carried out such that at least part of the MOF heating takes place in an atmosphere containing one or more selected from the group consisting of air, oxygen, ozone, and plasma.

In further embodiments, the decomposition process is carried out by heating the MOF for about 0.5 hour to 72 hours.

(B) Characterization

The properties of metal oxides providing high catalytic conversion activity for VOCs typically include:
(1) a porous structure;
(2) a planar or two-dimensional morphology (i.e., plate-like or sheet-like morphology); and
(3) a crystalline metal oxide phase.

Scanning electron microscopy (SEM) was used to observe sample morphologies. The samples were attached to a sample holder with carbon tape to allow SEM characterization on JEOL 6700F or JEOL 6390 microscope with an accelerating voltage of 10-20 kV. The samples were pre-coated with a conductive gold or carbon thin layer to improve electrical conductivity.

Powdered X-ray diffraction (XRD) was used to verify the crystallographic structures. XRD patterns of samples were obtained from PANalytical X'pert x-ray diffractometer equipped with 2 KW Cu X-ray source and graphite monochromator.

Raman spectroscopy was applied to study molecular vibrations and its intensity from the change of polarizability associate with the vibration. This provided chemical and structure information of both MOF materials and resulting metal oxides. Raman spectra were recorded from 100 to 3200 $cm^{-1}$ with a 514.5 nm Ar ion laser source.

Fourier transform infrared spectroscopy (FTIR) was collected on Bruker Vertex 70 Hyperion 1000. Samples and potassium bromide were pre-mixed with a weight ratio of 1:49, and scanning range is from 4000 to 400 $cm^{-1}$ with the resolution of 4 $cm^{-1}$.

Thermogravimetric analysis (TGA) was done on a TGA Q5000 analyzer (TA Instruments) in air or nitrogen. The sample was heated from room temperature at a heating rate of 10° C./min.

Nitrogen physisorption (also known as physical adsorption) was measured on a Beckman Coulter SA 3100 surface area analyzer. 0.1 g of sample was degassed under vacuum at 200° C. for 90 min, and nitrogen physisorption measurements were carried out at −196° C.

EXAMPLES OF MOFS AND CORRESPONDING METAL OXIDES

Example A. MOF Material Ce-BDC and Metal Oxide $CeO_2$

Figure 2C:
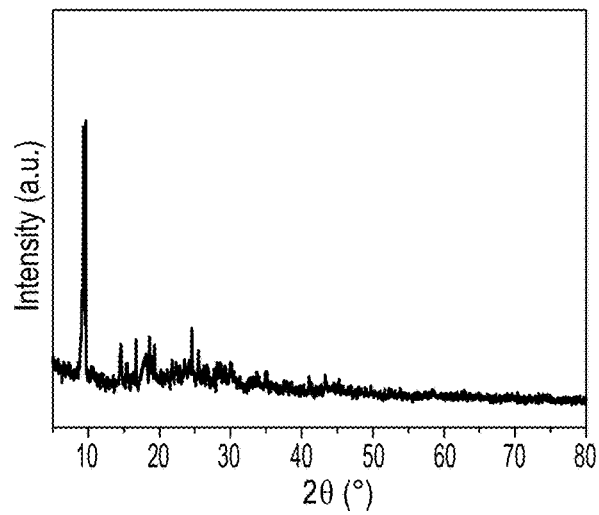

Ce-BDC is comprised of cerium centers and 1,4-benzenedicarboxylic acid (BDC) linkers. Ce-BDC is characterized by a parallelepiped structure—a 3-dimensional structure where each face is a parallelogram—with relatively smooth surfaces ranging in length from about 10 μm to 100 μm. See FIG. 2A. $CeO_2$ is prepared from Ce-BDC at 400° C. for 4 hours, and exhibits a hierarchical porous structure and layered morphology. See FIG. 2B.

Figure 2D:
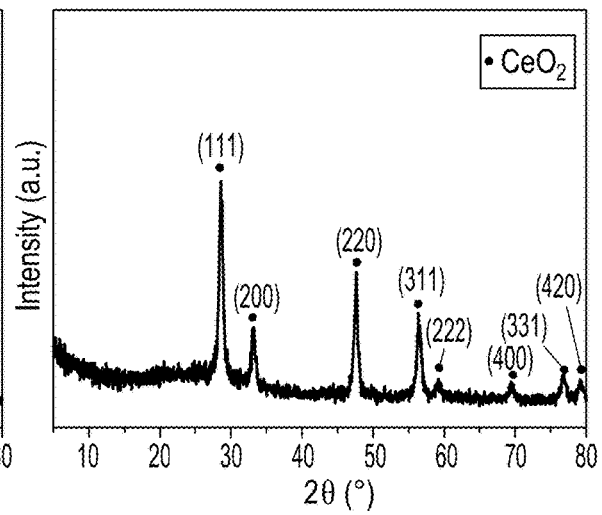

When compared to XRD patterns of Ce-BDC (see FIG. 2C), XRD patterns of $CeO_2$ (see FIG. 2D) show characteristic peaks at 28.6°, 33.2°, 47.6°, 56.3°, 59.2°, 69.5°, 76.8°, and 79.1° which correspond to the (111), (200), (222), (331), (200), (311), (400) and (420) lattice planes of $CeO_2$, respectively.

Figure 2E:
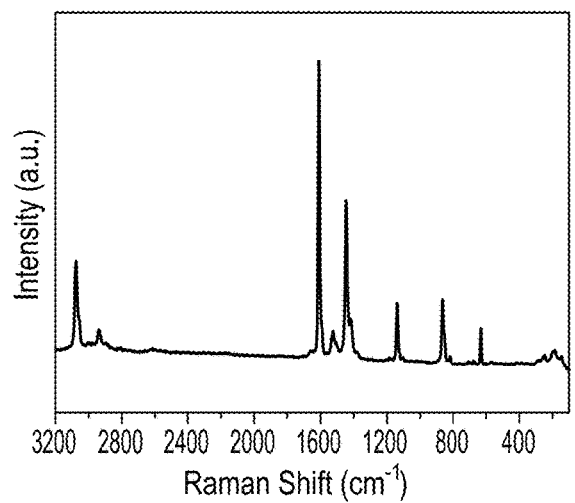
Figure 2F:
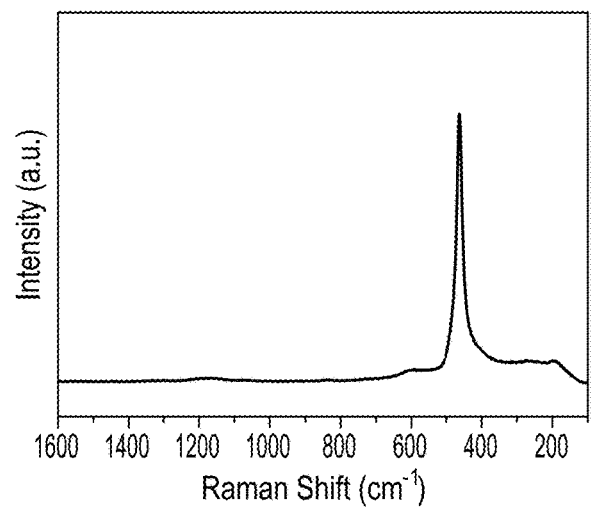

The Raman spectrum of Ce-BDC (see FIG. 2E) displays vibrations at 3077 $cm^{-1}$, 2936 $cm^{-1}$, 1611 $cm^{-1}$, 1448 $cm^{-1}$, 1141 $cm^{-1}$, 867 $cm^{-1}$, 634 $cm^{-1}$, 247 $cm^{-1}$, 192 $cm^{-1}$, 147 $cm^{-1}$. In contrast, $CeO_2$ has a fluorite structure which is verified by Raman vibrations at 464 $cm^{-1}$, 598 $cm^{-1}$, and 1179 $cm^{-1}$ (see FIG. 4F) which can be ascribed to $F_{2g}$ mode, defect-related (D) band, and the second longitudinal optical (2LO) mode, respectively.

Figure 2G:
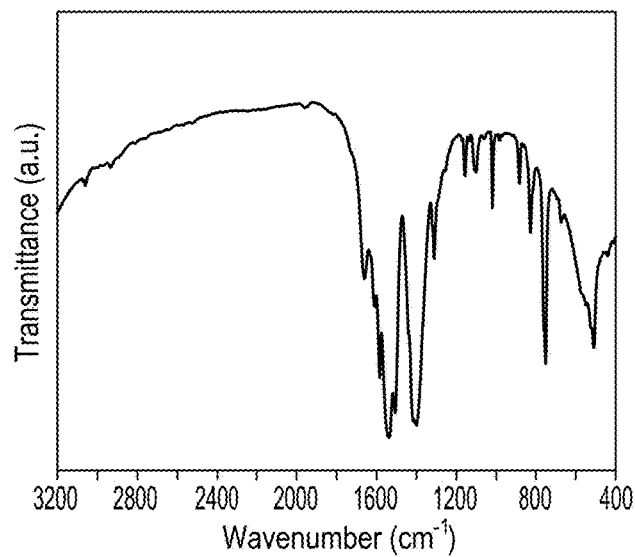
FIG. 2G shows FTIR spectra of Ce-BDC.
Figure 2H:
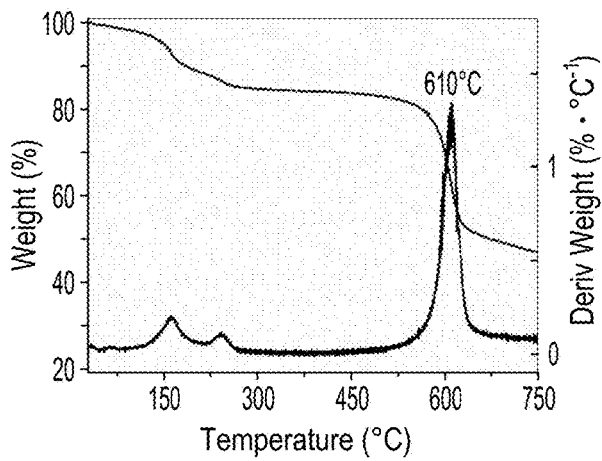
FIGS. 2H and 2I show TG curves of Ce-BDC in nitrogen (2H) and air (2I)
Figure 2I:
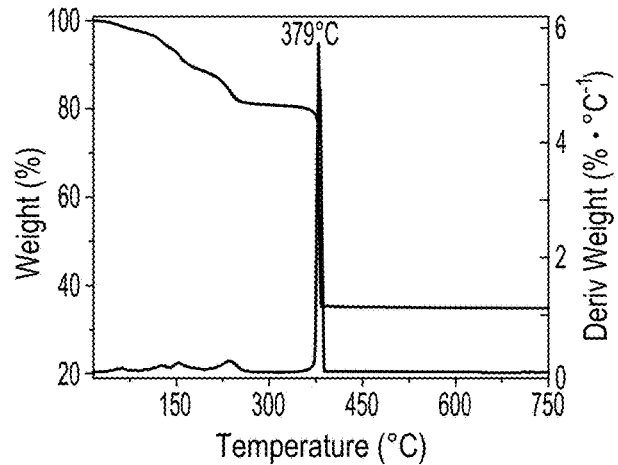
Figure 2J:
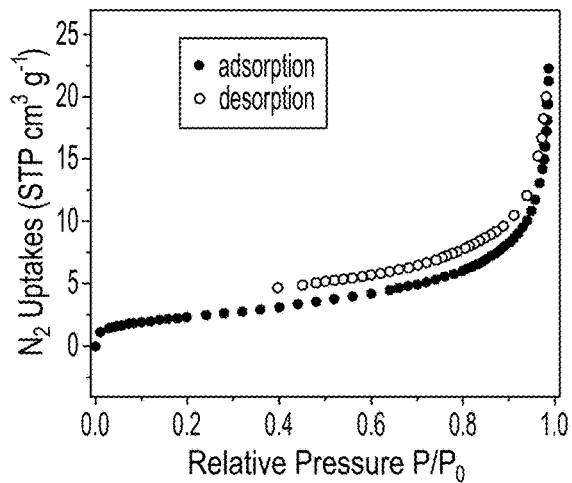
FIGS. 2J-2L show nitrogen adsorption-desorption isotherms of Ce-BDC (2J), $CeO_2$ prepared at 400° C. (2K), and $CeO_2$ prepared at 600° C. (2L).
Figure 2K:
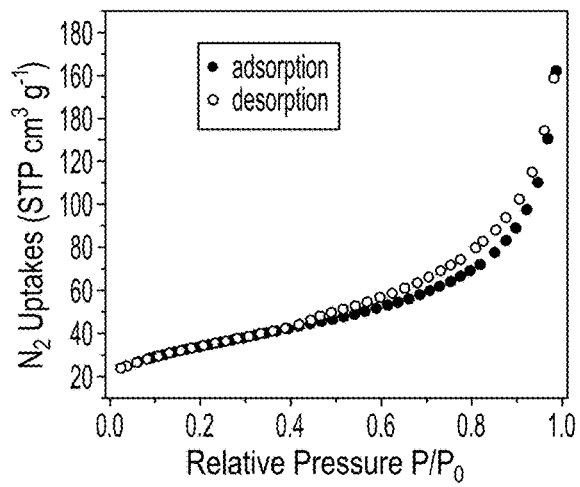
Figure 2L:
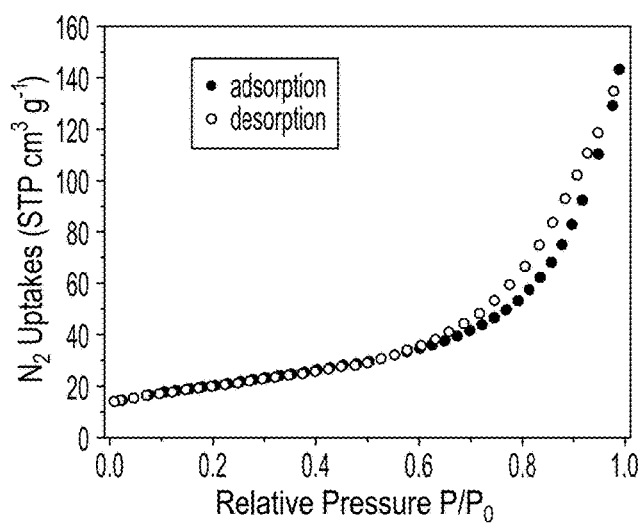

FIG. 2G is a FTIR spectrum of Ce-BDC. FIG. 2H and FIG. 2I are TG curves of Ce-BDC, tested in nitrogen and in air, respectively. The decomposition temperatures of Ce-BDC in nitrogen and in air are about 610° C. and 380° C., respectively. FIG. 2J, FIG. 2K and FIG. 2L show nitrogen physisorption isotherms of Ce-BDC, and of $CeO_2$ prepared at 400° C. and 600° C., respectively.

Table 1 summarizes the porous structure data for Ce-BDC, and for $CeO_2$ prepared at 400° C. and 600° C. The lower decomposition temperature during the preparation of $CeO_2$ (i.e., 400° C.) results in $CeO_2$ with a higher surface area (i.e., 117.3 $m^2\ g^{-1}$).

TABLE 1

| Samples | $S_{BET}$ ($m^2 \cdot g^{-1}$) | $D_{Pore}$ (nm) | $V_{Total}$ ($cm^3 \cdot g^{-1}$) |
|---|---|---|---|
| Ce-BDC | 10.9 | 15.8 | 0.04 |
| $CeO_2$ 400° C. | 117.3 | 8.6 | 0.25 |
| $CeO_2$ 600° C. | 70.9 | 12.5 | 0.22 |

Example B. MOF Material V-BDC and Metal Oxide $V_2O_5$

V-BDC is comprised of vanadium centers and 1,4-benzenedicarboxylic acid linkers. $V_2O_5$ is prepared from V-BDC at 300° C. for 4 hours.

Figure 3E:
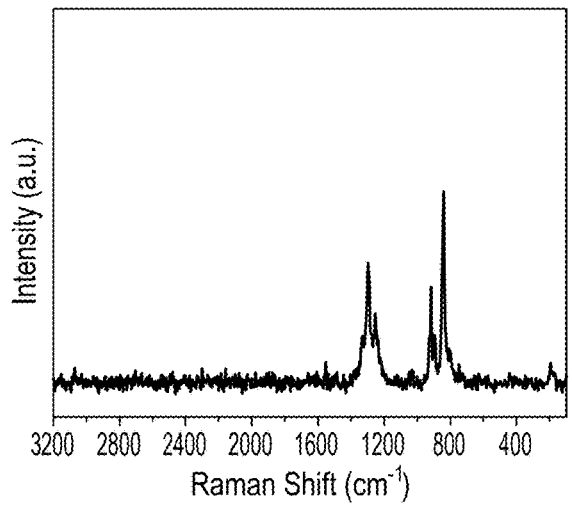
Figure 3F:
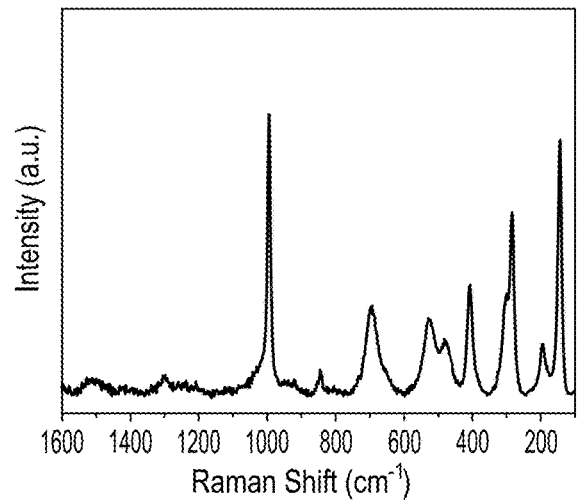
Figure 3G:
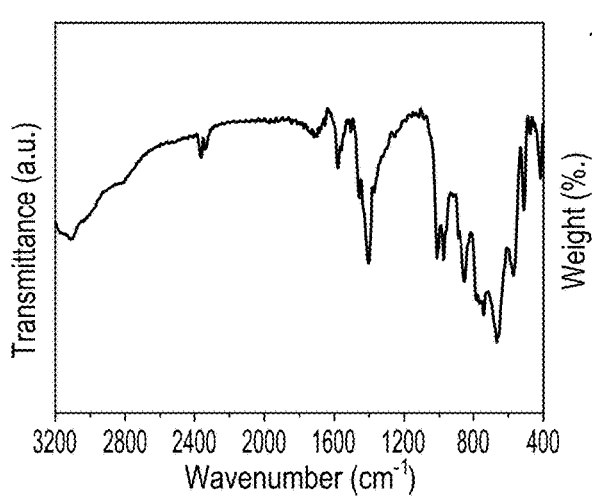
Figure 3H:
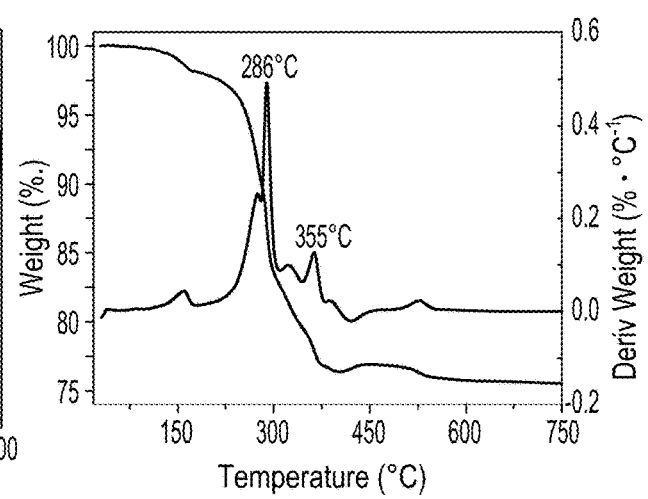

V-BDC has parallelepiped morphology with dimensions from 5 μm to 50 μm (FIG. 3A). $V_2O_5$ has a bundle-like structure (FIG. 3B). FIG. 3C and FIG. 3D compare XRD patterns of V-BDC and $V_2O_5$. The characteristic peaks at 15.7°, 20.5°, 22.0°, 26.4°, 31.4°, 31.7°, 34.6°, 41.4°, 47.9°, and 51.4° correspond to the (200), (001), (101), (110), (400), (011), (310), (002), (600), and (601) lattice planes of $V_2O_5$, respectively. FIG. 3E and FIG. 3F compare Raman spectra of V-BDC and $V_2O_5$, and FIG. 3G presents FTIR spectrum of V-BDC. The TG curve of V-BDC in air (FIG. 3H) indicates its decomposition temperature is about 290° C.

Example C. MOF Material Mn-BDC and Metal Oxide $MnO_x$

Mn-BDC is comprised of manganese centers and 1,4-benzenedicarboxylic acid linkers. $MnO_x$ is prepared from Mn-BDC at 450° C. for 4 hours.

Figure 4E:
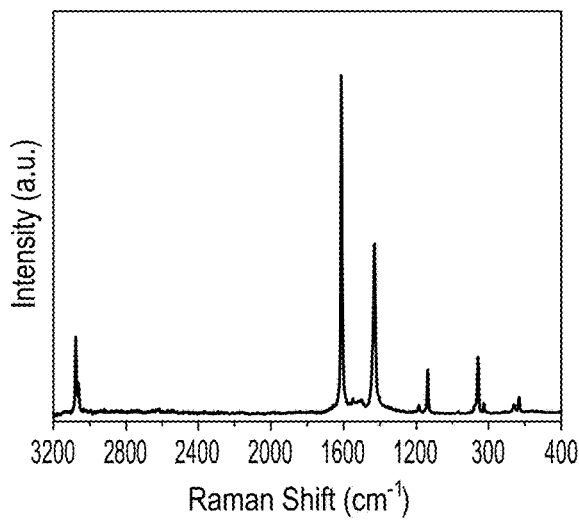
Figure 4F:
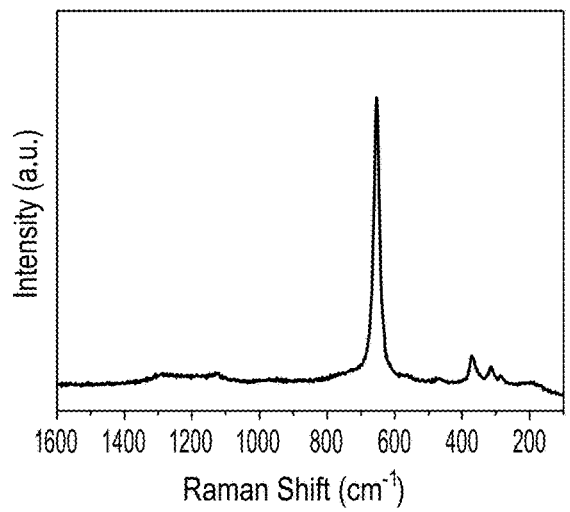
Figure 4G:
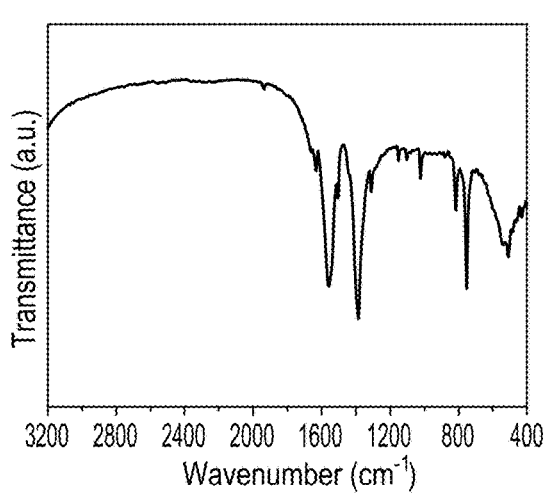
Figure 4H:
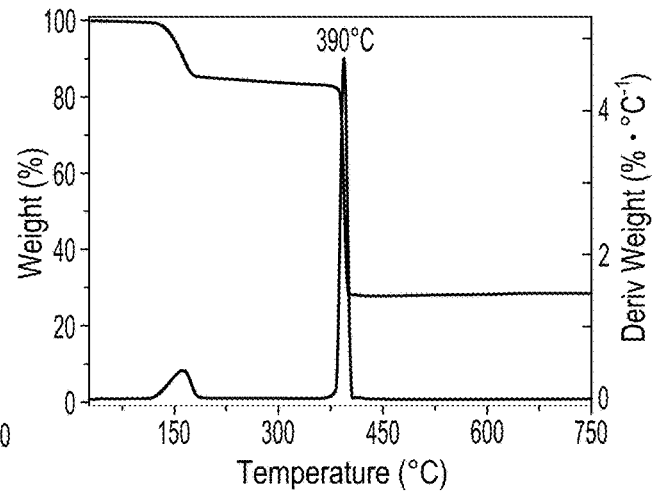

Mn-BDC has parallelepiped morphology with linear dimensions of about 100 μm (see FIG. 4A). SEM image of $MnO_x$ presents a porous bundle-like structure (FIG. 4B). FIG. 4C and FIG. 4D compare XRD patterns of Mn-BDC and $MnO_x$. The characteristic peaks at 23.1°, 26.1°, 33.0°, 34.1°, 37.3°, 38.3°, 45.3°, 49.5°, 51.4°, 55.2°, and 65.8° correspond to the $Mn_2O_3$ (211), MnOOH (11-1), $Mn_2O_3$ (222), MnOOH (020), MnOOH (200), $Mn_2O_3$ (400), $Mn_2O_3$ (332), $Mn_2O_3$ (431), MnOOH (002), $Mn_2O_3$ (440), and $Mn_2O_3$ (622) lattice planes, respectively. FIG. 4E and FIG. 4F compare Raman spectra of Mn-BDC and $MnO_x$, and FIG. 4G presents a FTIR spectrum of Mn-BDC. The TG curve of Mn-BDC in air (FIG. 4H) indicates its decomposition temperature is about 440° C.

Example D. MOF Material Ni-BDC and Metal Oxide NiO

Ni-BDC is comprised of nickel centers and 1,4-benzenedicarboxylic acid linkers. NiO is prepared from Ni-BDC at 450° C. for 4 hours.

Figure 5A:
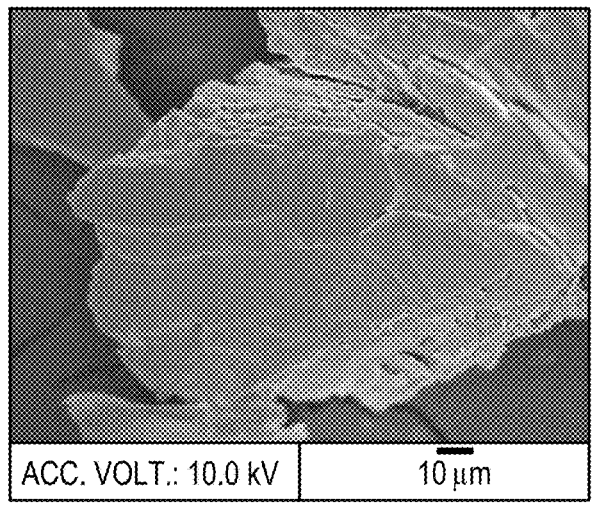
FIGS. 5A-5H present SEM images, XRD patterns and Raman spectra of MOF material Ni-BDC (5A, 5C, and 5E, respectively) and metal oxide NiO (5B, 5D, and 5F, respectively), and FTIR spectra (5G) and TG curve in air (5H) of Ni-BDC.
Figure 5B:
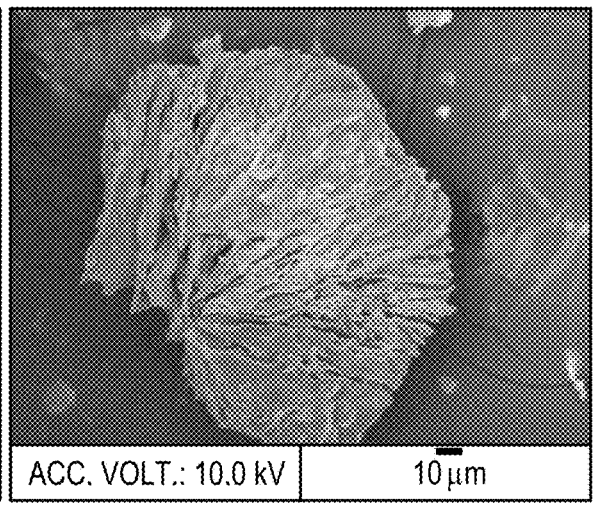

Ni-BDC has a layered, fan-shaped morphology with dimensions from about 10 μm to 100 μm (see FIG. 5A). NiO exhibits a fan-shaped porous structure with more layers (see FIG. 5B).

Figure 5C:
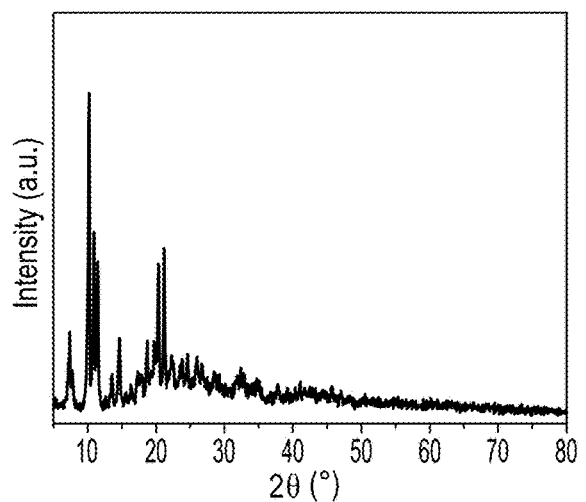
Figure 5D:
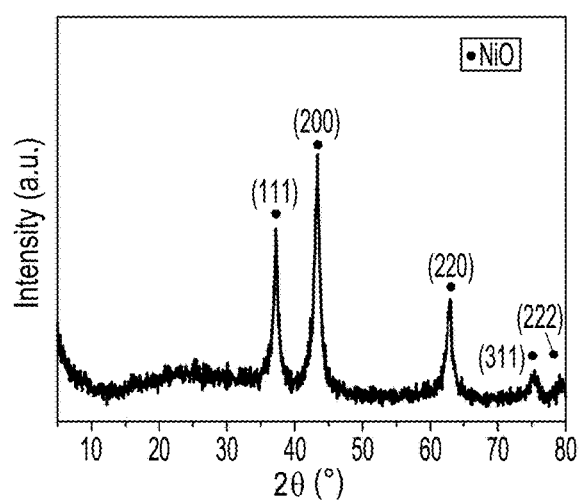
Figure 5E:
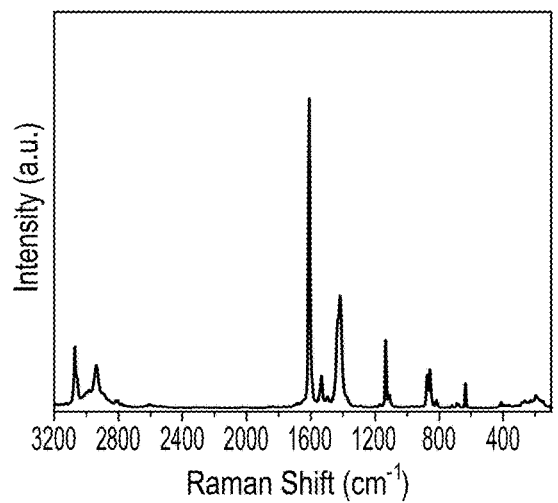
Figure 5F:
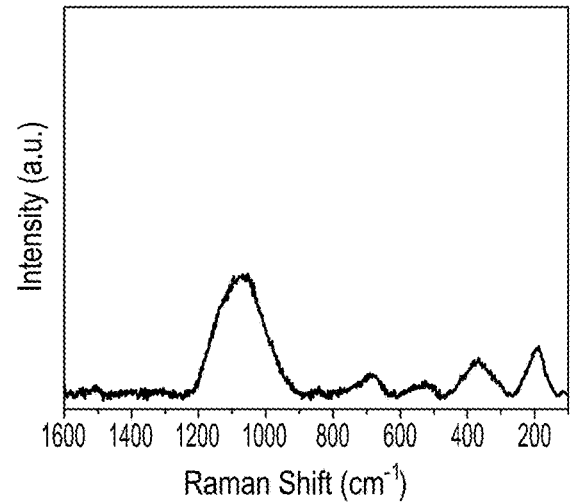
Figure 5G:
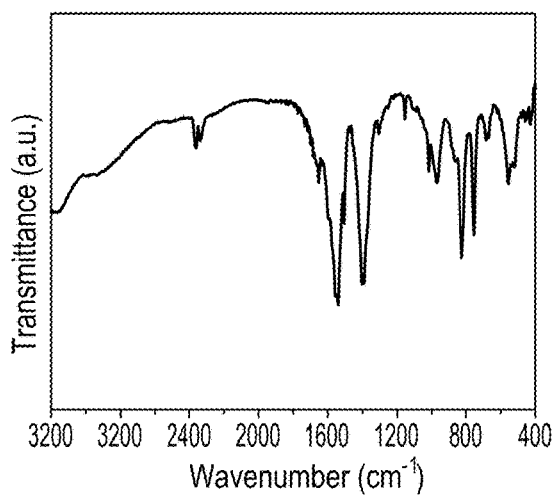
Figure 5H:
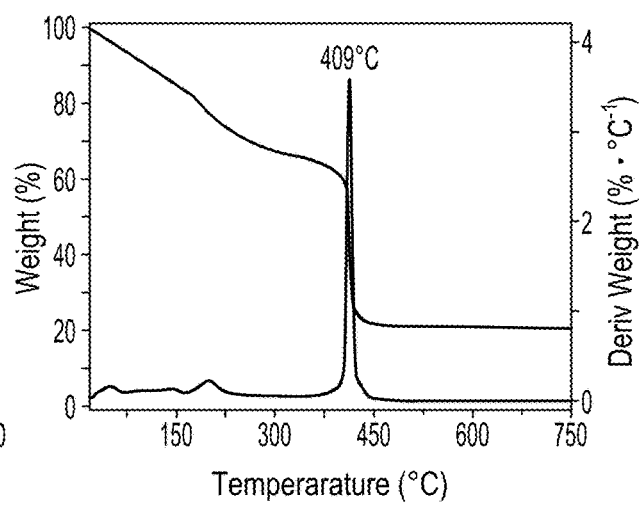

FIG. 5C and FIG. 5D allow a comparison of XRD patterns for Ni-BDC and NiO. The characteristic peaks for NiO at 37.3°, 43.4°, 63.0°, 75.4° and 79.3° correspond to the (111), (200), (220), (311) and (222) lattice planes of NiO, respectively. FIG. 5E and FIG. 5F compare Raman spectra of Ni-BDC and NiO, while FIG. 5G presents a FTIR spectrum of Ni-BDC. The TG curve of Ni-BDC in air (see FIG. 5H) indicates its decomposition temperature is about 410° C.

Example E. MOF Material Cu-BDC and Metal Oxide CuO

Cu-BDC is comprised of copper centers and 1,4-benzenedicarboxylic acid linkers. CuO is prepared from Cu-BDC at 350° C. for 4 hours.

Figure 6A:
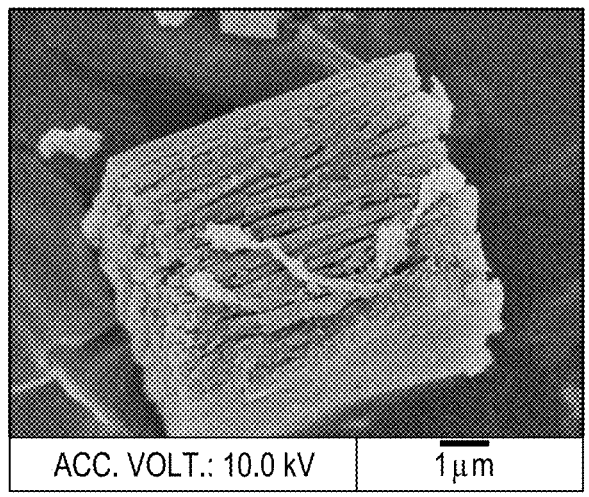
FIGS. 6A-6H present SEM images, XRD patterns and Raman spectra of MOF material Cu-BDC (6A, 6C, and 6E, respectively) and metal oxide CuO (6B, 6D, and 6F, respectively), and FTIR spectra (6G) and TG curve in air (6H) of Cu-BDC.
Figure 6B:
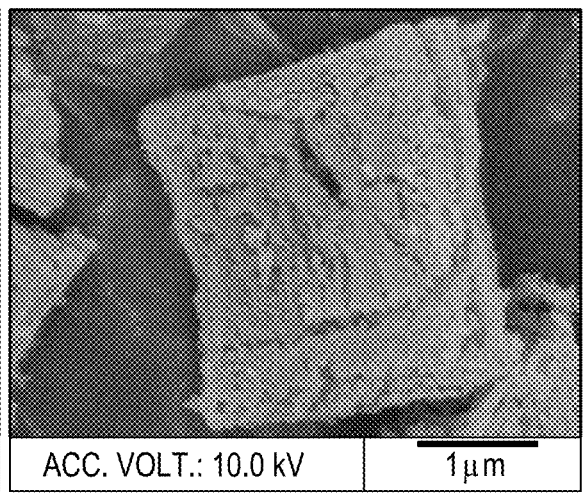
Figure 6C:
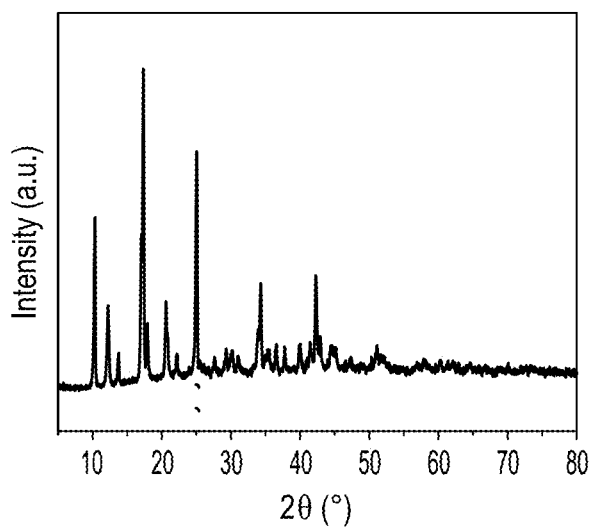
Figure 6D:
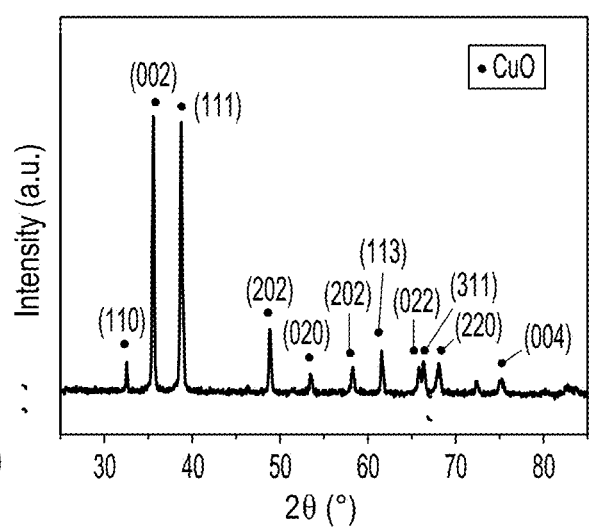
Figure 6E:
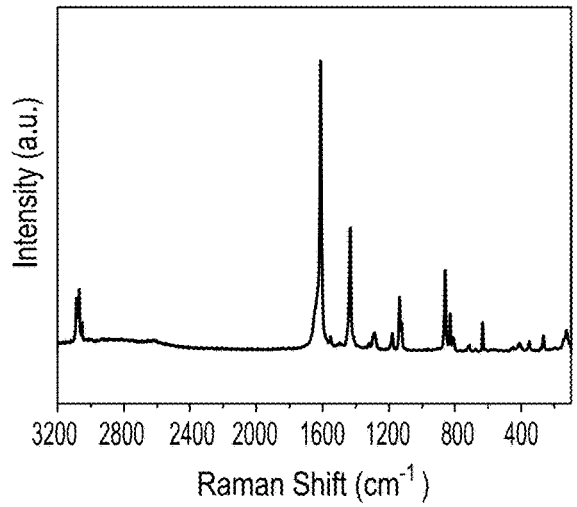
Figure 6F:
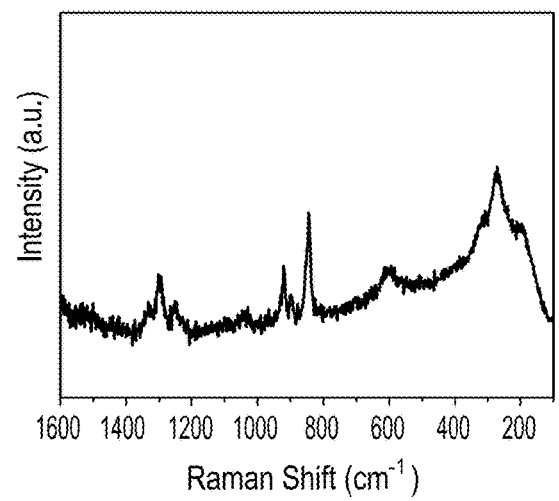
Figure 6G:
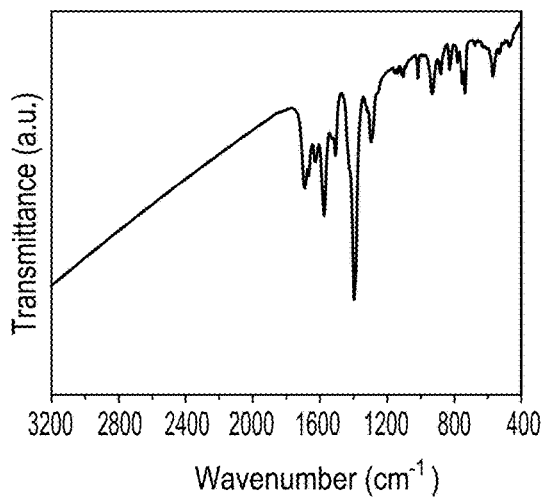
Figure 6H:
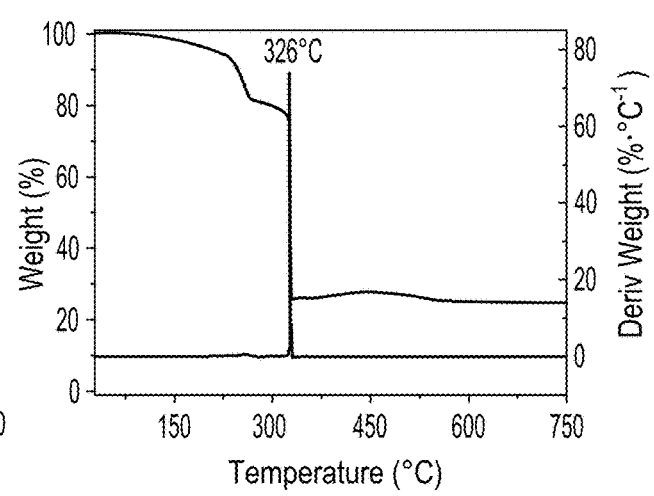

Cu-BDC has a parallelepiped structure with relatively smooth surface and dimensions from 0.5 μm to 5 μm (see FIG. 6A). A SEM image of CuO (see FIG. 6B) shows a hierarchical porous structure. FIG. 6C and FIG. 6D compare XRD patterns of Cu-BDC and CuO. The characteristic peaks for CuO at 32.6°, 35.6°, 38.7°, 48.9°, 53.5°, 58.3°, 61.6°, 65.8°, 66.4°, 68.1° and 75.2° correspond to the (110), (002), (111), (202), (020), (202), (113), (022), (311), (220) and (004) lattice planes of CuO, respectively. FIG. 6E and FIG. 6F compare Raman spectra of Cu-BDC and CuO, while FIG. 6G presents a FTIR spectrum of Cu-BDC. The TG curve of Cu-BDC in air (see FIG. 6H) indicates its decomposition temperature is about 330° C.

Example F. MOF Material Ce/Cu-BDC and Metal Oxide $CeCuO_x$

Ce/Cu-BDC is constructed by a combination of cerium and copper centers and 1,4-benzenedicarboxylic acid linkers. $CeCuO_x$ is prepared from Ce/Cu-BDC at 350° C. for 4 hours.

Figure 7A:
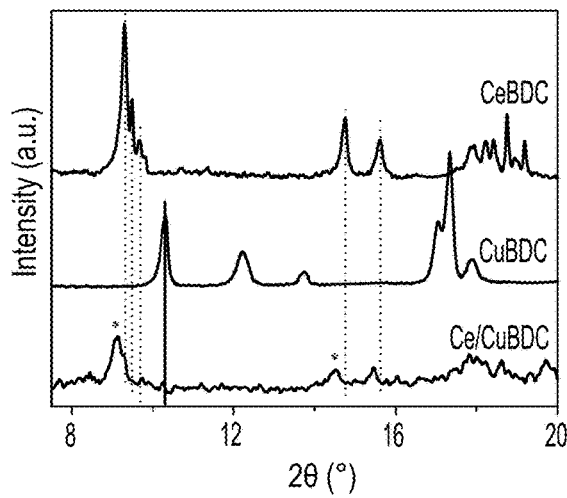
FIGS. 7A-7F present XRD patterns (7A) and Raman spectra (7B) of MOF materials Ce-BDC, Cu-BDC and Ce/Cu-BDC; a TG curve in air of Ce/Cu-BDC (7C); a SEM image of metal oxide composite $CeCuO_x$ (7D); and XRD patterns (7E) and Raman spectra (7F) of metal oxides $CeO_2$, CuO and $CeCuO_x$.
Figure 7B:
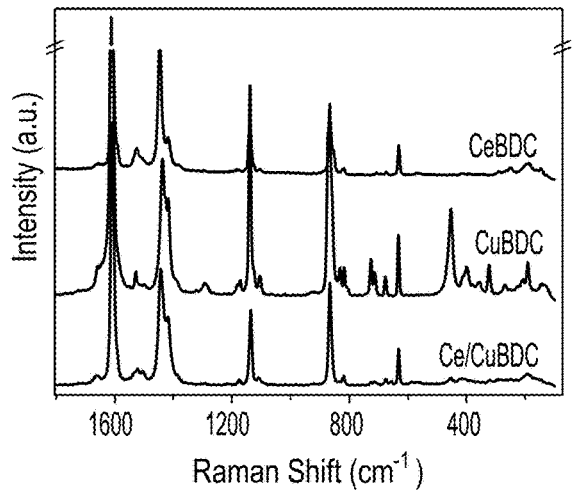

FIG. 7A and FIG. 7B compares XRD patterns and Raman spectra of Ce-BDC, Cu-BDC and Ce/Cu-BDC, respectively. From FIG. 7A, the appearance of new characteristic peaks indicates that Ce/Cu-BDC is not merely a mixture of Ce-BDC and Cu-BDC.

Figure 7C:
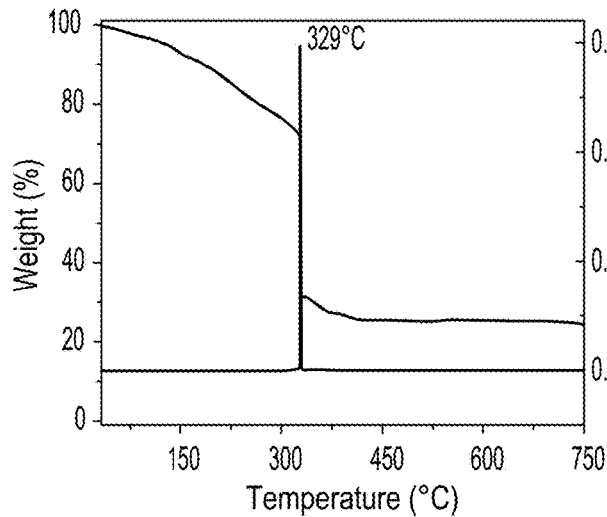

The TG curve of Ce/Cu-BDC in air (FIG. 7C) indicates its decomposition temperature is about 330° C. Since decomposition temperatures of Ce-BDC and Cu-BDC are different (380° C. and 330° C.), the single decomposition temperature of Ce/Cu-BDC also indicates that Ce/Cu-BDC is uniform in molecular scale.

Figure 7D:
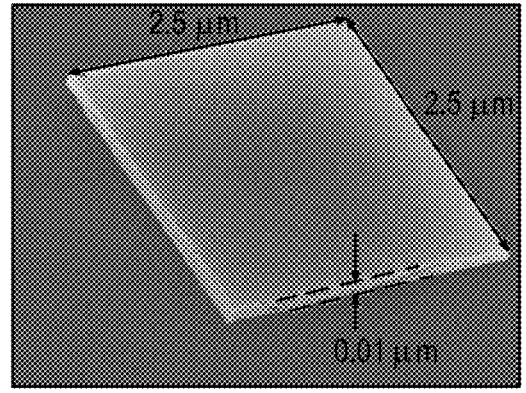
Figure 7E:
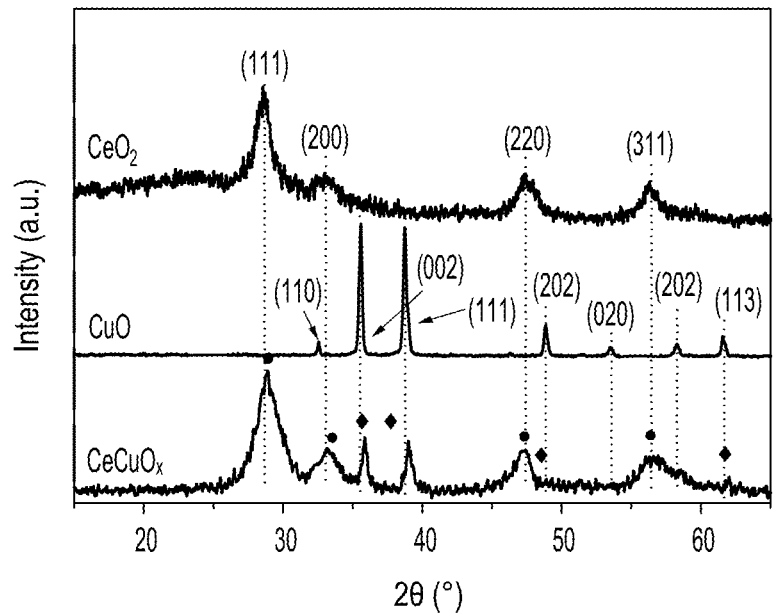
Figure 7F:
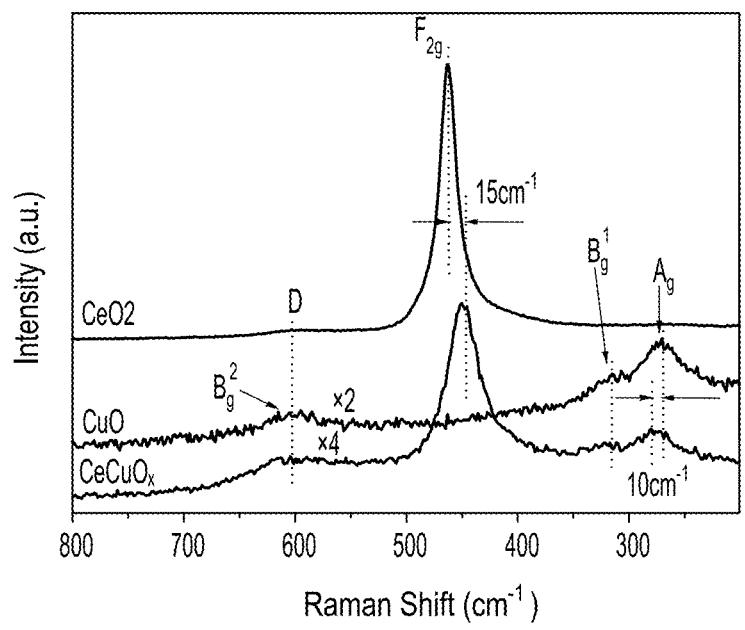
Figure 8A:
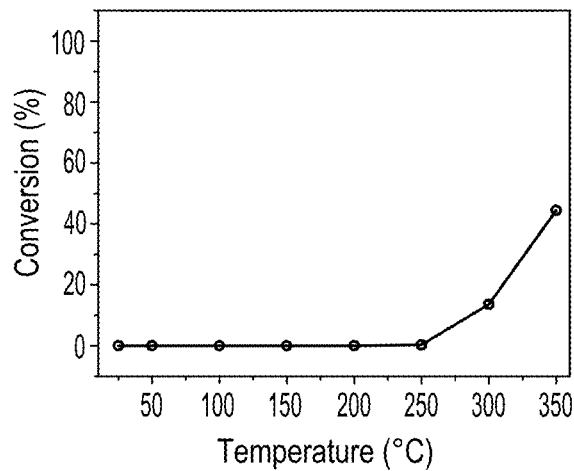
FIGS. 8A-8G present light-off curves of $ZrO_2$ (8A), $V_2O_5$ (8B), $Cr_2O_3$ (8C), $MnO_x$ (8D), $Fe_2O_3$ (8E), $Co_3O_4$ (8F), and NiO (8G) catalysts for catalytic oxidation reaction of toluene.
Figure 8B:
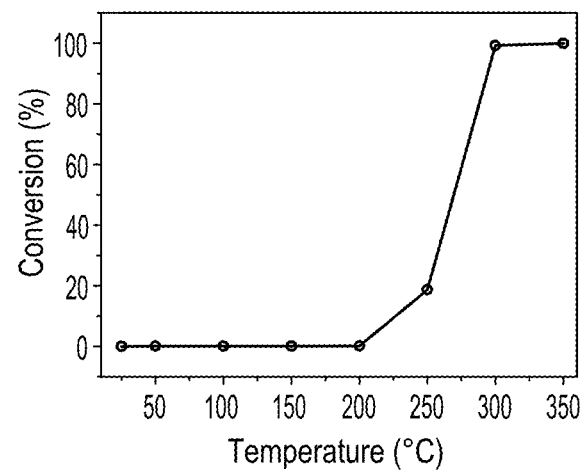
Figure 8C:
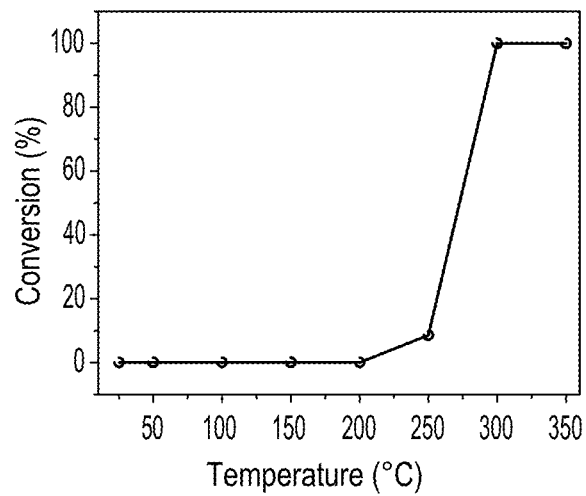
Figure 8D:
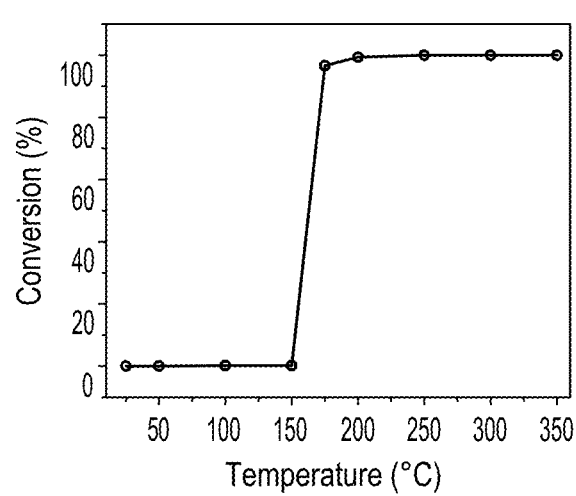
Figure 8E:
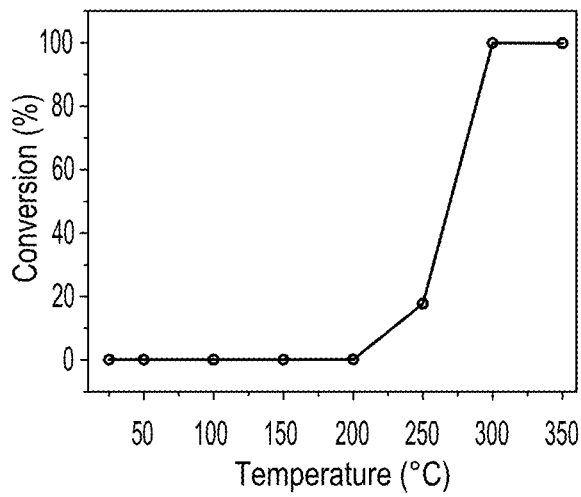
Figure 8F:
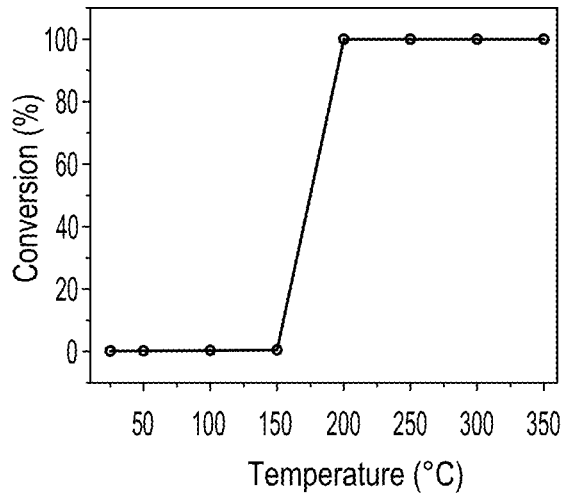
Figure 8G:
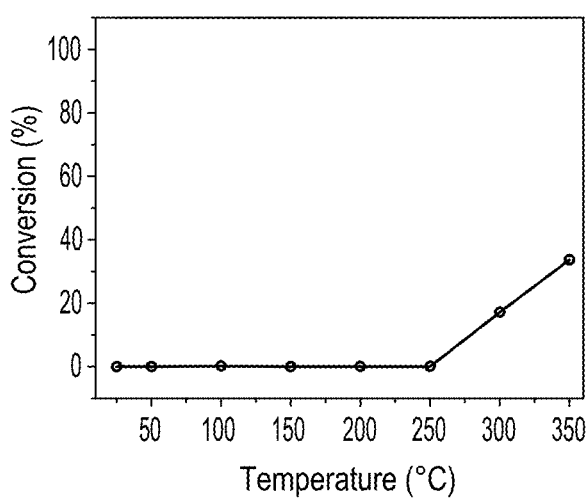
Figure 9A:
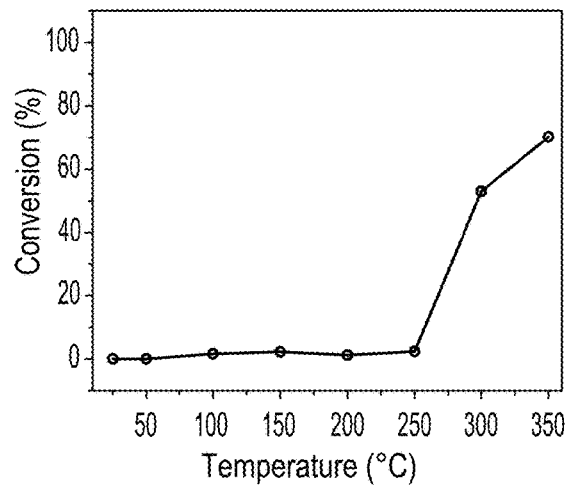
FIGS. 9A-9E present light-off curves of $CeO_2$ catalysts prepared in ozone at 100° C. for 12 h (9A); in ozone at 100° C. for 12 h and then in air at 250° C. for 2 h (9B); in ozone at 100° C. for 12 h and then in air at 400° C. for 4 h (9C); in oxygen at 300° C. for 4 h (9D); and in nitrogen at 650° C. for 4 h and then in air at 350° C. for 2 h (9E) for catalytic oxidation reaction of toluene.
Figure 9B:
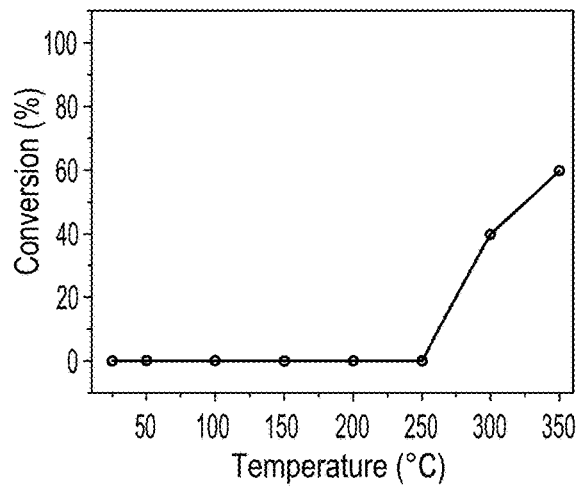
Figure 9C:
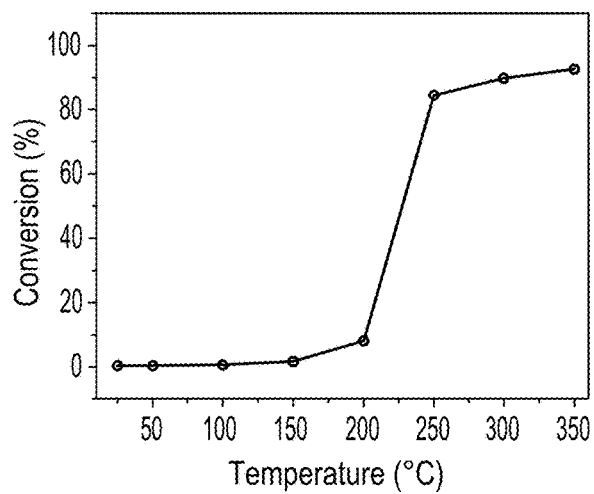
Figure 9D:
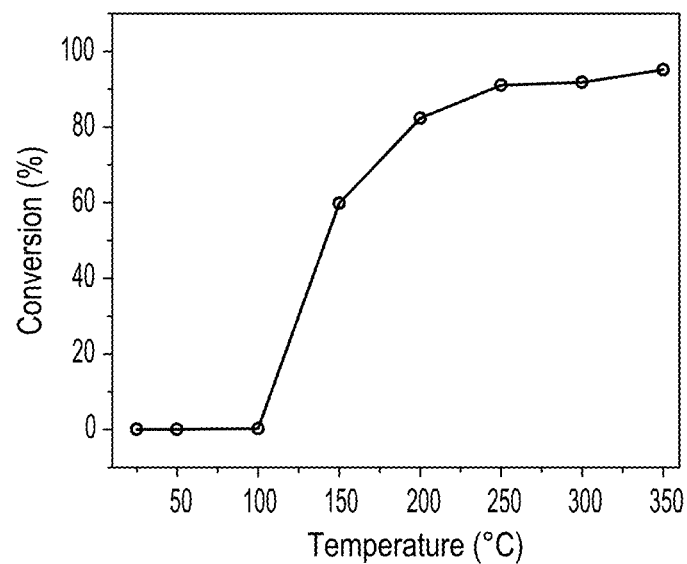
Figure 9E:
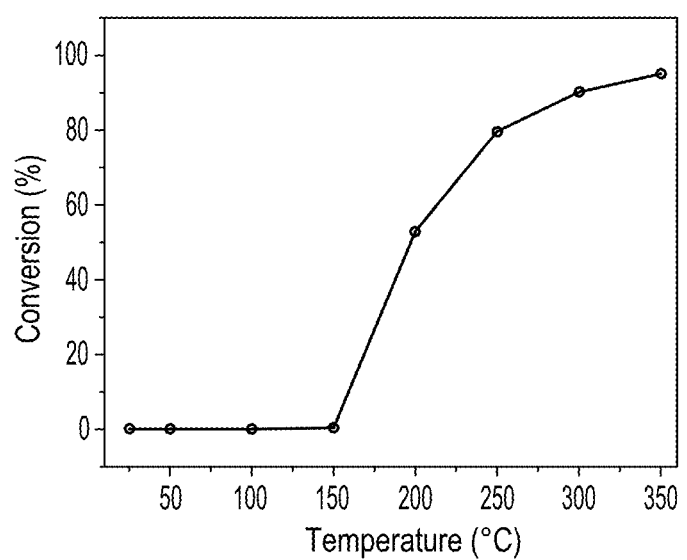

The SEM image of $CeCuO_x$ (see FIG. 7D) presents a typical planar structure with dimensions of about 2.5 μm in width and about 0.01 μm (10 nm) in thickness. FIG. 7E and FIG. 7F compares XRD patterns and Raman spectra of $CeO_2$, CuO and $CeCuO_x$, respectively. The shift of diffraction peaks and Raman signals indicates the formation of binary oxides $CeO_2$ and CuO.

(C) Catalysis Application

The metal oxides catalyst derived from MOF materials, as described herein, are useful for catalytic oxidation of organic compounds. In particular, these transition metal oxides are highly active for providing catalytic conversion of VOCs in air, following the Mars and Van Krevelen mechanism. In this mechanism, the VOC is adsorbed on the surface of the catalyst, and reacts with the lattice oxygen of the metal oxides, leaving oxygen vacancies. The catalysts are replenished by oxygen from the gas phase present during the reaction.

FIG. 8 presents the light-off curves (i.e., the conversion-temperature plots of catalytic reactions) for $ZrO_2$ (8A), $V_2O_5$ (8B), $Cr_2O_3$ (8C), $MnO_x$, (8D), $Fe_2O_3$ (8E), $Co_3O_4$ (8F), and NiO (8G) derived from MOF materials for catalytic oxidation of toluene. These catalytic activities depending on light-off temperature are ranked in the following order of catalytic efficacy:

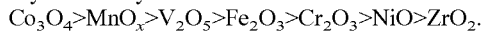

$Co_3O_4 > MnO_x > V_2O_5 > Fe_2O_3 > Cr_2O_3 > NiO > ZrO_2$.

FIG. 9 compares the light-off curves of $CeO_2$ prepared under different conditions for catalytic oxidation of toluene: ozone, 100° C., 12 hours (9A); ozone, 100° C., 12 hours then air, 250° C., 2 hours (9B); ozone, 100° C., 12 hours then air, 400° C., 4 hours (9C); oxygen, 300° C., 4 hours (9D); nitrogen, 650° C., 4 hours then air, 350° C., 2 hours (9E). The catalysts prepared at least partially in ozone (FIGS. 9A-9C) exhibit lower activities than those prepared in oxygen or nitrogen and air (FIG. 9D and FIG. 9E). This may result from the loss of oxygen defect sites in $CeO_2$ catalysts prepared in ozone.

Figure 10:
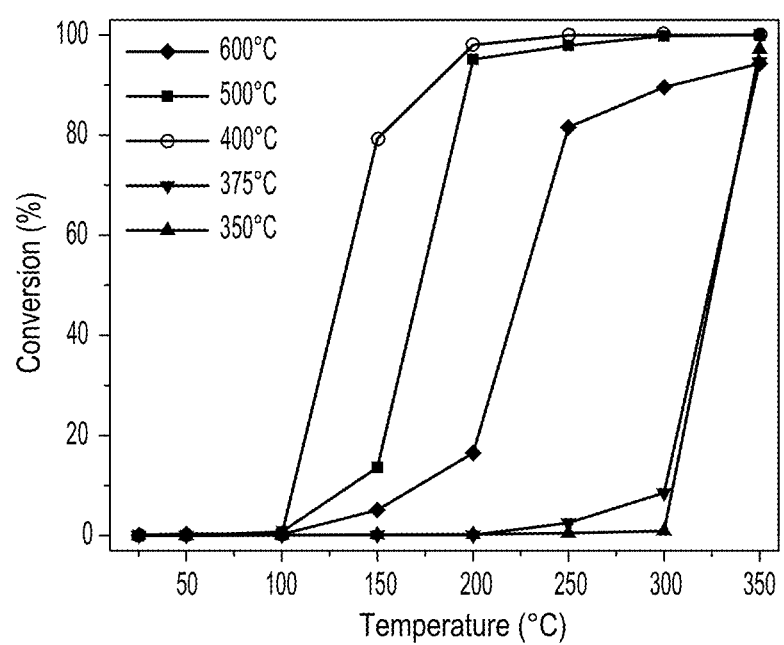
FIG. 10 presents light-off curves of $CeO_2$ catalysts prepared at 350° C., 375° C., 400° C., 500° C. and 600° C. for 4 h for catalytic oxidation reaction of toluene.

The transformation temperature from Ce-BDC to $CeO_2$ in pure oxygen can be decreased to 300° C. compared to that in nitrogen and air. FIG. 10 presents the light-off curves of $CeO_2$ prepared at different temperatures for catalytic oxidation of toluene. Generally, the $CeO_2$ catalysts prepared at above the decomposition temperature of Ce-BDC (i.e., 380° C.) exhibit higher catalytic activities than those prepared at below 380° C. The $CeO_2$ catalyst prepared at 400° C. has the highest catalytic activity. When the transformation temperature was elevated to 500° C. or 600° C., the resulting decreases in surface area and pore volume likely account for the deteriorated catalytic activity, which decreased more as the transformation temperature increased.

Figure 11:
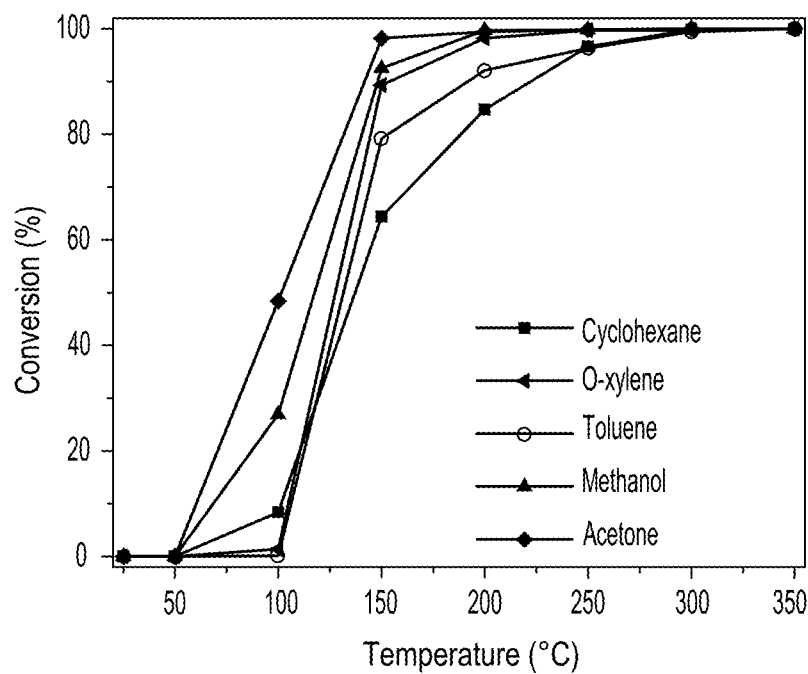
FIG. 11 presents light-off curves of $CeO_2$ prepared at 400° C. for 4 h for catalytic oxidation reactions of cyclohexane, o-xylene, toluene, methanol and acetone.

FIG. 11 presents the light-off curves of $CeO_2$ prepared at 400° C. for catalytic oxidation reactions of five different organic compound solvents—cyclohexane, 0-xylene, toluene, methanol, and acetone. At 100° C., the $CeO_2$ catalyst is active for all five compounds, and the conversion of acetone reaches 48%. At 150° C., the conversions of toluene, acetone, methanol, o-xylene and cyclohexane are 79%, 98%, 93%, 89% and 64%, respectively. The $CeO_2$ catalyst achieves complete conversion for all five organic compounds at 200° C. and higher.

Figure 12:
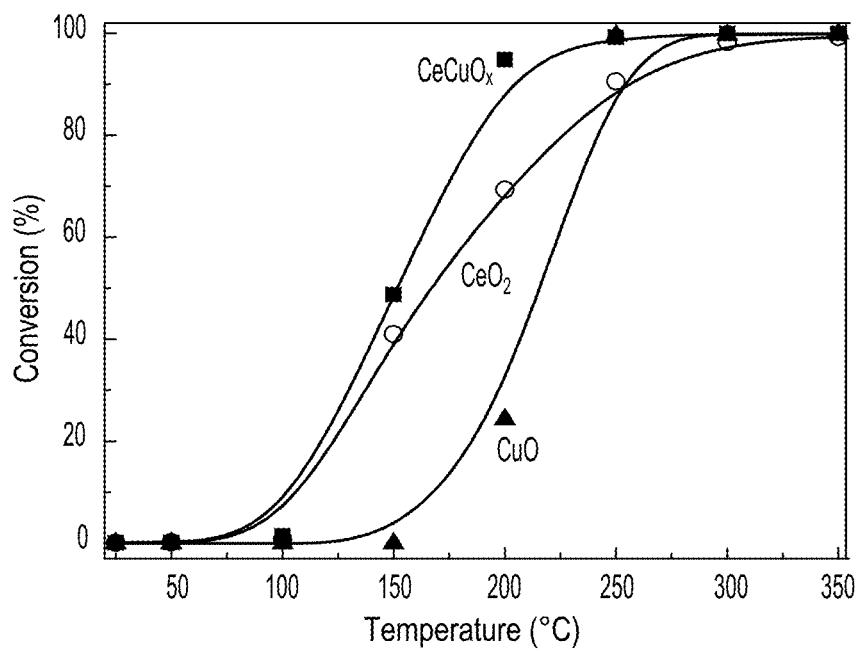
FIG. 12 presents light-off curves of $CeO_2$, CuO and $CeCuO_x$ prepared from Ce-BDC, Cu-BDC and Ce/Cu-BDC, respectively, for catalytic oxidation reaction of toluene.

FIG. 12 compares the light-off curves of $CeO_2$, CuO and $CeCuO_x$ for catalytic oxidation of toluene, at temperatures ranging from 50° C. to 350° C. The $CeCuO_x$ catalyst consistently exhibits the highest catalytic activity, with reaction temperatures for at 50% ($T_{50}$) and 90% conversions ($T_{90}$) of 150° C. and 185° C., respectively. The $T_{90}$ for $CeO_2$ and CuO are each about 250° C. We expect that the formation of $CeO_2$ and CuO binary oxides contributes to synergic catalytic activity.

PREPARATION EXAMPLES—MOFS AND METAL OXIDE CATALYSTS

Example 1: Ce-BDC 0.435 g $Ce(NO_3)_3 \cdot 6H_2O$ was dissolved in 8 mL N,N-dimethylformamide (DMF) and 0.330 g 1,4-benzenedicarboxylic acid ($H_2BDC$) was dissolved in 16 ml DMF. The two solutions were mixed together and 4 mL water was added. After stirring for 30 minutes, the mixture was kept at 100° C. for 24 hours. The product was washed with DMF and ethanol three times, followed by drying in a vacuum oven at 65° C. for 12 hours to obtain Ce-BDC.

Example 2: $CeO_2$ (Ce-BDC, Air, 400° C., 4 h)

Ce-BDC from Example 1 was placed in a ceramic crucible, and calcined in air in a furnace. The furnace was heated from room temperature to 400° C. at a heating rate of 3° C. min$^{-1}$, and maintained at 400° C. for 4 hours to obtain $CeO_2$.

Example 3: $CeO_2$ (Ce-BDC, Air, 500° C., 4 h)

Ce-BDC from Example 1 was placed in a ceramic crucible, and calcined in air in a furnace. The furnace was heated from room temperature to 500° C. at a heating rate of 3° C. min$^{-1}$, and kept at 500° C. for 4 hours to obtain $CeO_2$.

Example 4: $CeO_2$ (Ce-BDC, Air, 600° C., 4 h)

Ce-BDC from Example 1 was placed in a ceramic crucible, and calcined in air in a furnace. The furnace was heated from room temperature to 600° C. with the heating rate of 3° C. min$^{-1}$ and kept at 600° C. for 4 hours to obtain $CeO_2$.

Example 5: $CeO_2$ (Ce-BDC, Ozone, 100° C., 12 h)

Ce-BDC from Example 1 was placed in a flask with 130 mL min$^{-1}$ ozone flow (120 ppm in oxygen). The flask was kept at 100° C. for 12 hours to obtain $CeO_2$.

Example 6: CeO$_2$ (Ce-BDC, Ozone, 100° C., 12 h; Air, 250° C., 2 h)

CeO$_2$ from Example 5 was further calcined in air at 250° C. for 2 hours.

Example 7: CeO$_2$ (Ce-BDC, Ozone, 100° C., 12 h; Air, 400° C., 4 h)

CeO$_2$ from Example 5 was further calcined in air at 400° C. for 4 hours.

Example 8: CeO$_2$ (Ce-BDC, Oxygen, 300° C., 4 h)

Ce-BDC from Example 1 was placed in a ceramic crucible, and calcined in a tubular furnace with oxygen flow rate of 100 mL min$^{-1}$. The tubular furnace was kept at 300° C. for 4 hours to obtain CeO$_2$.

Example 9: CeO$_2$ (Ce-BDC, Nitrogen, 650° C., 4 h; Air, 350° C., 2 h)

Ce-BDC from Example 1 was placed in a ceramic crucible, and calcined in a tubular furnace with nitrogen and air flow rates of 100 mL min$^{-1}$. The tubular furnace was kept with nitrogen flow at 650° C. for 4 hours, and then with air flow at 350° C. for 2 hours.

Example 10: V-BDC 0.585 g NH$_4$VO$_3$ and 0.805 g H$_2$BDC each were dissolved in separate 20 ml quantities of DMF and stirred for 6 hours, respectively. The two solutions were mixed along with 4 ml DDI (distilled, deionized) water and transferred into a Teflon-lined stainless steel autoclave, followed by heating to 200° C. for 6 hours. The product was washed with DMF and ethanol three times, followed by drying in a vacuum oven at 65° C. for 12 hours to produce V-BDC.

Example 11: V$_2$O$_5$ (V-BDC, Air, 300° C., 4 h)

V-BDC from Example 10 was placed in a ceramic crucible, and calcined in air in a furnace. The furnace was heated from room temperature to 300° C. at a heating rate of 3° C. min$^{-1}$, and kept at 300° C. for 4 hours to produce V$_2$O$_5$.

Example 12: Mn-BDC 0.171 g Mn(NO$_3$)$_2$·6H$_2$O and 0.221 g H$_2$BDC were dissolved separately in 30 ml quantities of DMF, respectively. The two solutions were mixed along with 2 ml DDI water and the combination was transferred into a Teflon-lined stainless steel autoclave, followed by heating at 120° C. for 12 hours. The product was washed with DMF and ethanol for three times, followed by drying in a vacuum oven at 65° C. for 12 hours to produce Mn-BDC.

Example 13: MnO$_x$ (Mn-BDC, Air, 450° C., 4 h)

Mn-BDC from Example 12 was placed in a ceramic crucible, and calcined in air in a furnace. The furnace was heated from room temperature to 450° C. at a heating rate of 3° C. min$^{-1}$, and kept at 450° C. for 4 hours to produce MnO$_x$.

Example 14: Ni-BDC 0.346 g NiCl$_2$.6H$_2$O and 0.664 g H$_2$BDC were dissolved in 20 mL and 10 mL DMF respectively, with vigorous stirring for 20 minutes at room temperature. Subsequently, the DMF solution of NiCl$_2$.6H$_2$O was slowly added to the ligand solution drop by drop. After forming a greenish solution, the mixture was transferred into a Teflon-lined stainless steel autoclave, followed by heating at 100° C. for 24 hours. The product was washed with DMF and ethanol three times, followed by drying in a vacuum oven at 65° C. for 12 hours to produce Mn-BDC.

Example 15: NiO (Ni-BDC, Air, 450° C., 4 h)

Ni-BDC from Example 14 was placed in a ceramic crucible, and calcined in air in a furnace. The furnace was heated from room temperature to 450° C. at a heating rate of 3° C. min$^{-1}$ and kept at 450° C. for 4 hours to produce NiO.

Example 16: Cu-BDC 0.240 g Cu(NO$_3$)$_2$·3H$_2$O and 0.160 g H$_2$BDC were dissolved in separate 20 ml quantities of DMF. The two solutions were mixed and transferred into a Teflon-lined stainless steel autoclave, followed by heating to 80° C. for 24 hours. The product was washed with DMF and dichloromethane three times, followed by drying in a vacuum oven at 65° C. for 24 hours to produce Cu-BDC.

Example 17: CuO (Cu-BDC, Air, 350° C., 4 h)

Cu-BDC from Example 16 was placed in a ceramic crucible, and calcined in air in a furnace. The furnace was heated from room temperature to 350° C. at a rate of 3° C. min$^{-1}$, and kept at 350° C. for 4 hours to produce CuO.

Example 18: Zr-BDC 0.175 g ZrCl$_4$ and 0.125 g H$_2$BDC were dissolved in 69 ml DMF at room temperature. The mixture was transferred into a Teflon-lined stainless steel autoclave, followed by heating to 100° C. for 24 hours. The product was washed with DMF and ethanol three times, followed by drying in a vacuum oven at 65° C. for 12 hours to produce Zr-BDC.

Example 19: ZrO$_2$ (Zr-BDC, Air, 550° C., 4 h)

Zr-BDC from Example 18 was placed in a ceramic crucible, and calcined in air in a furnace. The furnace was heated from room temperature to 550° C. with the heating rate of 3° C. min$^{-1}$ and kept at 550° C. for 4 hours to produce ZrO$_2$.

Example 20: Cr-BDC 0.500 g Cr(NO$_3$)$_3$·9H$_2$O and 0.805 g of H$_2$BDC were dissolved in separate quantities of 20 ml DMF. The two solutions were mixed, along with 4 ml DDI water, and the combination was transferred into a Teflon-lined stainless steel autoclave, followed by heating at 200° C. for 6 hours. The product was washed with DMF and ethanol three times, followed by drying in a vacuum oven at 65° C. for 12 hours to obtain Cr-BDC.

Example 21: Cr$_2$O$_3$ (Cr-BDC, Air, 350° C., 4 h)

Cr-BDC from Example 20 was placed in a ceramic crucible, and calcined in air in a furnace. The furnace was heated from room temperature to 350° C. at a rate of 3° C. min$^{-1}$ and kept at 350° C. for 4 hours to obtain $Cr_2O_3$.

Example 22: Fe-BDC 1.070 g $FeCl_3$ and 1.316 g $H_2BDC$ were dissolved in separate amounts of 20 ml DMF. The two solutions and 3.6 ml acetic acid were mixed and transferred into a Teflon-lined stainless steel autoclave, followed by heating to 110° C. for 24 hours. The product was washed with DMF and ethanol three times, followed by drying in a vacuum oven at 65° C. for 12 hours to produce Fe-BDC.

Example 23: $Fe_2O_3$ (Fe-BDC, Air, 550° C., 4 h)

Fe-BDC from Example 22 was placed in a ceramic crucible, and calcined in air in a furnace. The furnace was heated from room temperature to 550° C. at a rate of 3° C. min$^{-1}$ and kept at 550° C. for 4 hours to produce $Fe_2O_3$.

Example 24: Co-Imidazole 2.9 g $Co(NO_3)_2 \cdot 6H_2O$ and 3.3 g 2-methylimidazole were dissolved in separate 100 ml quantities of methanol, respectively. The two solutions were mixed and then transferred into a Teflon-lined stainless steel autoclave, followed by heating at 80° C. for 6 hours. The product was washed with methanol three times, followed by drying in a vacuum oven at 65° C. for 12 hours to produce Co-imidazole.

Example 25: $Co_3O_4$ (Co-Imidazole, Air, 350° C., 4 h)

Co-imidazole from Example 24 was placed in a ceramic crucible, and calcined in air in a furnace. The furnace was heated from room temperature to 350° C. at a rate of 3° C. min$^{-1}$ and kept at 350° C. for 4 hours to produce $Co_3O_4$.

Example 26: Ce/Cu-BDC 0.870 g $Ce(NO_3)_3 \cdot 6H_2O$ and 0.480 g $Cu(NO_3)_2 \cdot 3H_2O$ were dissolved in 40 mL DMF and stirred for 2 hours. 0.812 g $H_2BDC$ was dissolved in 40 mL DMF and stirred for 2 hours. The two solutions were mixed, along with 20 ml DDI water, and transferred into a Teflon-lined stainless steel autoclave, followed by heating to 80° C. for 24 hours. The product was washed with DMF and ethanol for three times, followed by drying in a vacuum oven at 65° C. for 12 hours to produce Ce/Cu-BDC.

Example 27: $CeCuO_x$ (Ce/Cu-BDC, Air, 350° C., 4 h)

Ce/Cu-BDC from Example 26 was placed in a ceramic crucible, and calcined in air in a furnace. The furnace was heated from room temperature to 350° C. at a rate of 3° C. min$^{-1}$ and kept at 350° C. for 4 hours to produce $CeCuO_x$.

Example 28: Catalytic Reaction

The catalytic oxidation reactions of organic compounds were operated in a fixed bed reactor with 500 ppm organic compounds in synthetic air (GHSV (gas hourly space velocity) of 23,000 h$^{-1}$). Before the reaction, 0.15 g of the catalysts were pre-treated in 50 mL min$^{-1}$ synthetic air at 250° C. for 2 hours. Reaction products were analyzed online by an Agilent 6890 gas chromatography equipped with Carbowax 20M packed column and series-connected thermal conductivity and flame ionization detectors.

The embodiments described in this disclosure can be combined in various ways. One of skill in the art would recognize that certain of the aspects or features described for one particular embodiment may be incorporated into another embodiment mentioned in or suggested by this disclosure. While various novel features of the inventive principles have been shown, described and pointed out as applied to particular embodiments thereof, it should be understood that various omissions and substitutions and changes may be made by those skilled in the art without departing from the spirit of this disclosure. Those skilled in the art will appreciate that the inventive principles can be practiced in other than the described embodiments, which are presented for purposes of illustration and not limitation.

What is claimed is:

1. A method of preparing a porous metal oxide catalyst for oxidizing volatile organic compounds (VOCs), comprising
    (a) preparing a metal-organic framework (MOF) material; and
    (b) decomposing the MOF material by heating the MOF material to a temperature of above 200° C. to below 500° C. to produce a porous metal oxide catalyst useful for removing one or more VOCs from an atmosphere or environment
    wherein the MOF is prepared from a combination of metal ions, ligands, and one or more selected from the group consisting of solvents, water, and ionic liquids,
    wherein the porous metal oxide catalyst has planar or two-dimensional morphologies and a surface area ranging from 70.9 m$^2$ g$^{-1}$ to 117.3 m$^2$ g$^{-1}$, and
    wherein the porous metal oxide catalyst consists of ceria having a pore diameter of 8.6 nm.

2. The method of claim 1, wherein the metal oxide catalyst is produced by heating the MOF in an atmosphere without added ozone.

3. The method of claim 1, wherein the MOF is heated in an inert atmosphere.

4. The method of claim 1, wherein at least part of the MOF heating takes place in an atmosphere containing one or more selected from the group consisting of air, oxygen, ozone, and plasma.

5. The method of claim 1, wherein the MOF is heated for a period of about 0.5 hours to about 72 hours.

6. A metal oxide catalyst formulation including a porous metal oxide catalyst for oxidizing volatile organic compounds (VOCs) prepared by a method comprising:
    (a) preparing a metal-organic framework (MOF) material; and
    (b) decomposing the MOF material by heating the MOF material to a temperature of above 200° C. to below 500° C. to produce a porous metal oxide catalyst useful for removing one or more VOCs from an atmosphere or environment,
    wherein the MOF is prepared from a combination of metal ions, ligands, and one or more selected from the group consisting of solvents, water, and ionic liquids,
    wherein the porous metal oxide catalyst has planar or two-dimensional morphologies, and
    a surface area of 117.3 m$^2$ g$^{-1}$ and a pore diameter of 8.6 nm, and
    wherein the porous metal oxide catalyst consists of ceria.

7. A porous metal oxide catalyst for oxidizing volatile organic compounds (VOCs) prepared by a method comprising:

(a) preparing a metal-organic framework (MOF) material; and
(b) decomposing the MOF material by heating the MOF material to a temperature of above 200° C. to below 500° C. to produce a porous metal oxide catalyst useful for removing one or more VOCs from an atmosphere or environment,
wherein the MOF is prepared from a combination of metal ions, ligands, and one or more selected from the group consisting of solvents, water, and ionic liquids,
wherein the catalyst has planar or two-dimensional morphologies and a surface area ranging from 70.9 $m^2 g^{-1}$ to 117.3 $m^2 g^{-1}$, and
wherein the porous metal oxide catalyst consists of ceria having a pore diameter of 8.6 nm.

8. A porous metal oxide catalyst formulation including a porous metal oxide catalyst for oxidizing volatile organic compounds (VOCs) prepared by a method comprising:

(a) preparing a metal-organic framework (MOF) material; and
(b) decomposing the MOF material by heating the MOF material to a temperature of above 200° C. to below 500° C. to produce a porous metal oxide catalyst useful for removing one or more VOCs from an atmosphere or environment,
wherein the MOF is prepared from a combination of metal ions, ligands, and one or more selected from the group consisting of solvents, water, and ionic liquids,
wherein a planar or two-dimensional morphology of the porous metal oxide catalyst produced from the MOF is retained by selecting a decomposition temperature based on thermal analysis results obtained for the MOF,
wherein the porous metal oxide catalyst has a surface area of 117.3 $m^2 g^{-1}$ and a pore diameter of 8.6 nm, and
wherein the porous metal oxide catalyst consists of ceria.

* * * * *